(12) United States Patent
Schwarz et al.

(10) Patent No.: US 11,970,984 B2
(45) Date of Patent: *Apr. 30, 2024

(54) GAS TURBINE ENGINE WITH POWER DENSITY RANGE

(71) Applicant: RTX CORPORATION, Farmington, CT (US)

(72) Inventors: Frederick M. Schwarz, Glastonbury, CT (US); Daniel Bernard Kupratis, Wallingford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,126

(22) Filed: Feb. 8, 2023

(65) Prior Publication Data

US 2023/0383699 A1 Nov. 30, 2023

Related U.S. Application Data

(63) Continuation of application No. 17/730,782, filed on Apr. 27, 2022, now Pat. No. 11,608,786, which is a
(Continued)

(51) Int. Cl.
*F02C 7/36* (2006.01)
*F01D 1/26* (2006.01)
(Continued)

(52) U.S. Cl.
CPC .................. *F02C 7/36* (2013.01); *F01D 1/26* (2013.01); *F01D 15/12* (2013.01); *F02C 3/107* (2013.01);
(Continued)

(58) Field of Classification Search
CPC ............... F02C 7/36; F01D 15/12; F02K 3/06
See application file for complete search history.

(56) References Cited

U.S. PATENT DOCUMENTS

| 791,754 A | 6/1905 | Danzenbaker |
| 1,090,416 A | 3/1914 | Roth |

(Continued)

FOREIGN PATENT DOCUMENTS

| CA | 2789325 A1 | 4/2013 |
| CA | 2789465 A1 | 4/2013 |

(Continued)

OTHER PUBLICATIONS

Response to Observations by Patantee filed for European Patent No. EP2737180B1 by Rolls Royce granted Apr. 13, 2016, dated Jul. 18, 2018.
(Continued)

*Primary Examiner* — Justin D Seabe
(74) *Attorney, Agent, or Firm* — Carlson, Gaskey & Olds, P.C.

(57) ABSTRACT

A gas turbine engine includes a propulsor section including a propulsor, a compressor section including a first compressor and a second compressor, a geared architecture, a turbine section including a first turbine and a drive turbine, and a power density of greater than or equal to 4.75 and less than or equal to 5.5 lbf/in$^3$, wherein the power density is a ratio of a thrust provided by the engine to a volume of the turbine section.

30 Claims, 4 Drawing Sheets

Related U.S. Application Data continuation of application No. 17/037,916, filed on Sep. 30, 2020, now Pat. No. 11,346,286, which is a continuation of application No. 16/186,811, filed on Nov. 12, 2018, now Pat. No. 10,830,153, which is a continuation of application No. 14/593,056, filed on Jan. 9, 2015, now Pat. No. 10,125,693, which is a continuation-in-part of application No. 13/446,312, filed on Apr. 13, 2012, now abandoned.

(60) Provisional application No. 61/619,111, filed on Apr. 2, 2012.

(51) Int. Cl.
| | |
|---|---|
| F01D 15/12 | (2006.01) |
| F02C 3/107 | (2006.01) |
| F02K 3/06 | (2006.01) |

(52) U.S. Cl.
CPC ...... *F02K 3/06* (2013.01); *F05D 2260/40311* (2013.01); *F05D 2270/051* (2013.01)

(56) References Cited

U.S. PATENT DOCUMENTS

| | | |
|---|---|---|
| 2,258,792 A | 10/1941 | New |
| 2,608,821 A | 9/1952 | Hunsaker |
| 2,620,157 A | 12/1952 | Walton et al. |
| 2,748,623 A | 6/1956 | Hill |
| 2,936,655 A | 5/1960 | Peterson et al. |
| 3,021,731 A | 2/1962 | Stoeckicht |
| 3,033,002 A | 5/1962 | William et al. |
| 3,111,005 A | 11/1963 | Howell et al. |
| 3,172,717 A | 3/1965 | Brasher et al. |
| 3,185,857 A | 5/1965 | Johnson |
| 3,194,487 A | 7/1965 | Tyler et al. |
| 3,250,512 A | 5/1966 | Alexander et al. |
| 3,287,906 A | 11/1966 | Mccormick |
| 3,352,178 A | 11/1967 | Lindgren et al. |
| 3,412,560 A | 11/1968 | Gaubatz |
| 3,434,288 A | 3/1969 | Petrie et al. |
| 3,526,092 A | 9/1970 | Steel et al. |
| 3,527,054 A | 9/1970 | Hemsworth et al. |
| 3,620,020 A | 11/1971 | Halliwell et al. |
| 3,664,612 A | 5/1972 | Skidmore et al. |
| 3,673,802 A | 7/1972 | Krebs et al. |
| 3,713,748 A | 1/1973 | Langley |
| 3,722,215 A | 3/1973 | Zhdanov et al. |
| 3,729,957 A | 5/1973 | Petrie et al. |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark et al. |
| 3,843,277 A | 10/1974 | Ehrich |
| 3,861,139 A | 1/1975 | Jones |
| 3,876,330 A | 4/1975 | Pearson et al. |
| 3,886,737 A | 6/1975 | Grieb |
| 3,892,358 A | 7/1975 | Gisslen |
| 3,932,058 A | 1/1976 | Harner et al. |
| 3,935,558 A | 1/1976 | Miller et al. |
| 3,986,720 A | 10/1976 | Knudsen et al. |
| 3,988,889 A | 11/1976 | Chamay et al. |
| 4,005,575 A | 2/1977 | Scott et al. |
| 4,084,861 A | 4/1978 | Greenberg et al. |
| 4,090,416 A | 5/1978 | Hicks |
| 4,130,872 A | 12/1978 | Haloff |
| 4,136,286 A | 1/1979 | O'Halloran et al. |
| 4,201,513 A | 5/1980 | Sales |
| 4,220,171 A | 9/1980 | Ruehr et al. |
| 4,221,114 A | 9/1980 | Wilde et al. |
| 4,233,555 A | 11/1980 | Roche |
| 4,240,250 A | 12/1980 | Harris |
| 4,251,987 A | 2/1981 | Adamson |
| 4,275,557 A | 6/1981 | Marvin et al. |
| 4,284,174 A | 8/1981 | Salvana et al. |
| 4,289,360 A | 9/1981 | Zirin |
| 4,304,522 A | 12/1981 | Newland |
| 4,405,892 A | 9/1983 | Staerzl |
| 4,446,696 A | 5/1984 | Sargisson et al. |
| 4,448,019 A | 5/1984 | Klees |
| 4,463,553 A | 8/1984 | Boudigues |
| 4,478,551 A | 10/1984 | Honeycutt, Jr. et al. |
| 4,611,464 A | 9/1986 | Hetzer et al. |
| 4,649,114 A | 3/1987 | Miltenburger et al. |
| 4,660,376 A | 4/1987 | Johnson |
| 4,693,616 A | 9/1987 | Rohra et al. |
| 4,696,156 A | 9/1987 | Burr et al. |
| 4,722,357 A | 2/1988 | Wynosky |
| 4,808,076 A | 2/1989 | Jarmon et al. |
| 4,809,498 A | 3/1989 | Giffin, III et al. |
| 4,825,644 A | 5/1989 | Bubello et al. |
| 4,825,723 A | 5/1989 | Martin |
| 4,827,712 A | 5/1989 | Coplin |
| 4,879,624 A | 11/1989 | Jones et al. |
| 4,885,912 A | 12/1989 | Nakhamkin |
| 4,887,424 A | 12/1989 | Geidel et al. |
| 4,909,031 A | 3/1990 | Grieb |
| 4,916,894 A | 4/1990 | Adamson et al. |
| 4,947,642 A | 8/1990 | Grieb et al. |
| 4,969,325 A | 11/1990 | Adamson et al. |
| 4,979,362 A | 12/1990 | Vershure, Jr. |
| 5,010,729 A | 4/1991 | Adamson et al. |
| 5,058,617 A | 10/1991 | Stockman et al. |
| 5,074,109 A | 12/1991 | Mandet et al. |
| 5,081,832 A | 1/1992 | Mowill |
| 5,102,379 A | 4/1992 | Pagluica et al. |
| 5,141,400 A | 8/1992 | Murphy et al. |
| 5,160,251 A | 11/1992 | Ciokajlo |
| 5,168,208 A | 12/1992 | Schultz et al. |
| 5,182,464 A | 1/1993 | Woodworth et al. |
| 5,252,905 A | 10/1993 | Wills et al. |
| 5,307,622 A | 5/1994 | Ciokajlo et al. |
| 5,317,877 A | 6/1994 | Stuart |
| 5,361,580 A | 11/1994 | Ciokajlo et al. |
| 5,388,964 A | 2/1995 | Ciokajlo et al. |
| 5,390,068 A | 2/1995 | Schultz et al. |
| 5,433,674 A | 7/1995 | Sheridan et al. |
| 5,447,411 A | 9/1995 | Curley et al. |
| 5,466,198 A | 11/1995 | McKibbin et al. |
| 5,486,533 A | 1/1996 | Mishra et al. |
| 5,486,553 A | 1/1996 | Deaner et al. |
| 5,520,512 A | 5/1996 | Walker et al. |
| 5,524,847 A | 6/1996 | Brodell et al. |
| 5,539,027 A | 7/1996 | Deaner et al. |
| 5,607,165 A | 3/1997 | Bredemeyer |
| 5,625,276 A | 4/1997 | Scott et al. |
| 5,634,767 A | 6/1997 | Dawson |
| 5,677,060 A | 10/1997 | Terentieva et al. |
| 5,694,027 A | 12/1997 | Satake et al. |
| 5,729,059 A | 3/1998 | Kilroy et al. |
| 5,734,255 A | 3/1998 | Thompson et al. |
| 5,740,668 A | 4/1998 | Fujiwara et al. |
| 5,754,033 A | 5/1998 | Thomson |
| 5,778,659 A | 7/1998 | Duesler et al. |
| 5,806,303 A | 9/1998 | Johnson |
| 5,857,836 A | 1/1999 | Stickler et al. |
| 5,886,890 A | 3/1999 | Ishida et al. |
| 5,915,917 A | 6/1999 | Eveker et al. |
| 5,949,153 A | 9/1999 | Tison et al. |
| 5,971,706 A | 10/1999 | Glista et al. |
| 5,975,841 A | 11/1999 | Lindemuth et al. |
| 5,985,470 A | 11/1999 | Spitsberg et al. |
| 6,073,439 A | 6/2000 | Beaven et al. |
| 6,104,171 A | 8/2000 | Dvorsky et al. |
| 6,172,717 B1 | 1/2001 | Ebihara |
| 6,205,432 B1 | 3/2001 | Gabbard et al. |
| 6,209,311 B1 | 4/2001 | Itoh et al. |
| 6,223,616 B1 | 5/2001 | Sheridan |
| 6,260,351 B1 | 7/2001 | Delano et al. |
| 6,307,622 B1 | 10/2001 | Lewis |
| 6,315,815 B1 | 11/2001 | Spadaccini et al. |
| 6,318,070 B1 | 11/2001 | Rey et al. |
| 6,339,927 B1 | 1/2002 | DiPietro, Jr. |
| 6,378,308 B1 | 4/2002 | Pfluger |

(56) References Cited

U.S. PATENT DOCUMENTS

| | | |
|---|---|---|
| 6,381,948 B1 | 5/2002 | Klingels |
| 6,387,456 B1 | 5/2002 | Eaton, Jr. et al. |
| 6,506,022 B2 | 1/2003 | Bunker |
| 6,517,341 B1 | 2/2003 | Brun et al. |
| 6,555,929 B1 | 4/2003 | Eaton et al. |
| 6,607,165 B1 | 8/2003 | Manteiga et al. |
| 6,619,030 B1 | 9/2003 | Seda et al. |
| 6,631,310 B1 | 10/2003 | Leslie |
| 6,639,331 B2 | 10/2003 | Schultz |
| 6,647,707 B2 | 11/2003 | Dev |
| 6,653,821 B2 | 11/2003 | Kern et al. |
| 6,657,416 B2 | 12/2003 | Kern et al. |
| 6,663,530 B2 | 12/2003 | Poulin et al. |
| 6,668,629 B1 | 12/2003 | Leslie |
| 6,669,393 B2 | 12/2003 | Schilling |
| 6,708,482 B2 | 3/2004 | Seda |
| 6,709,492 B1 | 3/2004 | Spadaccini et al. |
| 6,732,502 B2 | 5/2004 | Seda et al. |
| 6,735,954 B2 | 5/2004 | Macfarlane et al. |
| 6,763,653 B2 | 7/2004 | Orlando et al. |
| 6,792,759 B2 | 9/2004 | Rollins, III |
| 6,814,541 B2 | 11/2004 | Evans et al. |
| 6,847,297 B2 | 1/2005 | Lavoie et al. |
| 6,855,089 B2 | 2/2005 | Poulin et al. |
| 6,883,303 B1 | 4/2005 | Seda |
| 6,892,115 B2 | 5/2005 | Berkcan et al. |
| 6,895,741 B2 | 5/2005 | Rago et al. |
| 6,909,942 B2 | 6/2005 | Andarawis et al. |
| 6,914,763 B2 | 7/2005 | Reedy |
| 6,966,174 B2 | 11/2005 | Paul |
| 6,985,784 B2 | 1/2006 | Vandevanter et al. |
| 6,999,291 B2 | 2/2006 | Andarawis et al. |
| 7,019,495 B2 | 3/2006 | Patterson |
| 7,021,042 B2 | 4/2006 | Law |
| 7,043,340 B2 | 5/2006 | Papallo et al. |
| 7,055,306 B2 | 6/2006 | Jones et al. |
| 7,104,918 B2 | 9/2006 | Mitrovic |
| 7,144,349 B2 | 12/2006 | Mitrovic |
| 7,195,446 B2 | 3/2007 | Seda et al. |
| 7,216,475 B2 | 5/2007 | Johnson |
| 7,219,490 B2 * | 5/2007 | Dev .......................... F02C 7/10 60/262 |
| 7,223,197 B2 | 5/2007 | Poulin et al. |
| 7,269,938 B2 | 9/2007 | Moniz et al. |
| 7,299,621 B2 | 11/2007 | Bart et al. |
| 7,301,738 B2 | 11/2007 | Pearlman et al. |
| 7,328,580 B2 | 2/2008 | Lee et al. |
| 7,334,392 B2 | 2/2008 | Moniz et al. |
| 7,338,259 B2 | 3/2008 | Shah et al. |
| 7,374,403 B2 | 5/2008 | Decker et al. |
| 7,393,182 B2 | 7/2008 | Matheny |
| 7,406,830 B2 | 8/2008 | Valentian et al. |
| 7,409,819 B2 | 8/2008 | Henry |
| 7,451,592 B2 | 11/2008 | Taylor et al. |
| 7,513,102 B2 | 4/2009 | Moniz et al. |
| 7,513,103 B2 | 4/2009 | Orlando et al. |
| 7,557,544 B2 | 7/2009 | Heinz et al. |
| 7,591,754 B2 | 9/2009 | Duong et al. |
| 7,594,404 B2 | 9/2009 | Somanath et al. |
| 7,600,370 B2 | 10/2009 | Dawson |
| 7,610,763 B2 | 11/2009 | Somanath et al. |
| 7,626,259 B2 | 12/2009 | Wehrly, Jr. et al. |
| 7,631,484 B2 | 12/2009 | Giffin et al. |
| 7,632,064 B2 | 12/2009 | Somanath et al. |
| 7,656,060 B2 | 2/2010 | Algrain |
| 7,662,059 B2 | 2/2010 | McCune |
| 7,665,293 B2 | 2/2010 | Wilson, Jr. et al. |
| 7,685,808 B2 | 3/2010 | Orlando et al. |
| 7,694,505 B2 * | 4/2010 | Schilling ................ F02K 3/06 60/226.1 |
| 7,704,178 B2 | 4/2010 | Sheridan et al. |
| 7,716,914 B2 | 5/2010 | Schilling |
| 7,721,549 B2 | 5/2010 | Baran |
| 7,762,086 B2 | 7/2010 | Schwark |
| 7,765,786 B2 | 8/2010 | Klingels et al. |
| 7,797,946 B2 | 9/2010 | Kumar et al. |
| 7,806,651 B2 | 10/2010 | Kennepohl et al. |
| 7,815,417 B2 | 10/2010 | Somanath et al. |
| 7,816,813 B2 | 10/2010 | Yagudayev et al. |
| 7,824,305 B2 | 11/2010 | Duong et al. |
| 7,828,682 B2 | 11/2010 | Smook |
| 7,832,193 B2 | 11/2010 | Orlando et al. |
| 7,841,163 B2 | 11/2010 | Welch et al. |
| 7,841,165 B2 | 11/2010 | Orlando et al. |
| 7,871,247 B2 | 1/2011 | Shah et al. |
| 7,882,683 B2 | 2/2011 | Studer et al. |
| 7,882,693 B2 | 2/2011 | Schilling |
| 7,926,259 B2 | 4/2011 | Orlando et al. |
| 7,926,260 B2 | 4/2011 | Sheridan et al. |
| 7,959,532 B2 | 6/2011 | Suciu et al. |
| 7,997,868 B1 | 8/2011 | Liang |
| 8,001,763 B2 | 8/2011 | Grabowski et al. |
| 8,002,520 B2 | 8/2011 | Dawson et al. |
| 8,015,798 B2 | 9/2011 | Norris et al. |
| 8,015,828 B2 | 9/2011 | Moniz et al. |
| 8,061,969 B2 | 11/2011 | Durocher et al. |
| 8,075,261 B2 | 12/2011 | Merry et al. |
| 8,083,472 B2 | 12/2011 | Maguire |
| 8,083,474 B2 | 12/2011 | Hashimoto et al. |
| 8,091,371 B2 | 1/2012 | Durocher et al. |
| 8,104,265 B2 | 1/2012 | Kupratis |
| 8,106,633 B2 | 1/2012 | Dozier et al. |
| 8,166,748 B2 | 5/2012 | Schilling |
| 8,172,717 B2 | 5/2012 | Lopez et al. |
| 8,191,352 B2 | 6/2012 | Schilling |
| 8,205,432 B2 | 6/2012 | Sheridan |
| 8,297,916 B1 | 10/2012 | McCune et al. |
| 8,297,917 B1 | 10/2012 | McCune et al. |
| 8,561,383 B2 | 10/2013 | Suciu et al. |
| 8,640,336 B2 | 2/2014 | Sheridan et al. |
| 8,747,055 B2 | 6/2014 | McCune et al. |
| 8,756,908 B2 | 6/2014 | Sheridan et al. |
| 8,770,922 B2 | 7/2014 | McCune et al. |
| 8,834,099 B1 | 9/2014 | Topol et al. |
| 8,899,915 B2 | 12/2014 | McCune et al. |
| 9,133,729 B1 | 9/2015 | McCune et al. |
| 9,239,012 B2 | 1/2016 | McCune et al. |
| 9,297,917 B2 | 3/2016 | Mah et al. |
| 9,523,422 B2 | 12/2016 | McCune et al. |
| 9,540,948 B2 | 1/2017 | Schwarz et al. |
| 9,631,558 B2 | 4/2017 | McCune et al. |
| 9,752,511 B2 | 9/2017 | McCune et al. |
| 10,301,968 B2 | 5/2019 | McCune et al. |
| 10,590,802 B2 | 3/2020 | McCune et al. |
| 2003/0163983 A1 | 9/2003 | Seda et al. |
| 2003/0163984 A1 | 9/2003 | Seda et al. |
| 2003/0235523 A1 | 12/2003 | Lyubovsky et al. |
| 2005/0025627 A1 | 2/2005 | Harding et al. |
| 2005/0138914 A1 | 6/2005 | Paul |
| 2005/0226720 A1 | 10/2005 | Harvey et al. |
| 2005/0241292 A1 | 11/2005 | Taylor et al. |
| 2005/0279100 A1 | 12/2005 | Graziosi et al. |
| 2006/0029894 A1 | 2/2006 | Zinn et al. |
| 2006/0101804 A1 | 5/2006 | Stretton |
| 2006/0130456 A1 | 6/2006 | Suciu et al. |
| 2006/0177302 A1 | 8/2006 | Berry |
| 2006/0179818 A1 | 8/2006 | Merchant |
| 2006/0228206 A1 | 10/2006 | Decker et al. |
| 2006/0236675 A1 | 10/2006 | Weiler |
| 2006/0244327 A1 | 11/2006 | Kundel |
| 2006/0288686 A1 | 12/2006 | Cherry et al. |
| 2007/0012026 A1 | 1/2007 | Dev |
| 2007/0022735 A1 | 2/2007 | Henry et al. |
| 2007/0084183 A1 | 4/2007 | Moniz et al. |
| 2007/0084189 A1 | 4/2007 | Moniz et al. |
| 2007/0087892 A1 | 4/2007 | Orlando et al. |
| 2007/0125066 A1 | 6/2007 | Orlando et al. |
| 2007/0214795 A1 | 9/2007 | Cooker et al. |
| 2007/0225111 A1 | 9/2007 | Duong et al. |
| 2007/0262661 A1 | 11/2007 | Ai |
| 2007/0265133 A1 | 11/2007 | Smook |
| 2008/0003096 A1 | 1/2008 | Kohli et al. |
| 2008/0022653 A1 | 1/2008 | Schilling |
| 2008/0044276 A1 | 2/2008 | McCune et al. |

(56) References Cited

U.S. PATENT DOCUMENTS

| | | |
|---|---|---|
| 2008/0056888 A1 | 3/2008 | Somanath et al. |
| 2008/0097813 A1 | 4/2008 | Collins et al. |
| 2008/0098713 A1 | 5/2008 | Orlando et al. |
| 2008/0098714 A1 | 5/2008 | Orlando et al. |
| 2008/0098718 A1 | 5/2008 | Henry et al. |
| 2008/0112791 A1 | 5/2008 | Lee et al. |
| 2008/0116009 A1 | 5/2008 | Sheridan et al. |
| 2008/0148707 A1 | 6/2008 | Schilling |
| 2008/0148881 A1 | 6/2008 | Moniz et al. |
| 2008/0149445 A1 | 6/2008 | Kern et al. |
| 2008/0184694 A1 | 8/2008 | Guimbard et al. |
| 2008/0190095 A1 | 8/2008 | Baran |
| 2008/0276621 A1 | 11/2008 | Somanath et al. |
| 2008/0304974 A1 | 12/2008 | Marshall et al. |
| 2008/0317588 A1 | 12/2008 | Grabowski et al. |
| 2009/0007569 A1 | 1/2009 | Lemmers, Jr. et al. |
| 2009/0053058 A1 | 2/2009 | Kohlenberg et al. |
| 2009/0056306 A1 | 3/2009 | Suciu et al. |
| 2009/0056343 A1 | 3/2009 | Suciu et al. |
| 2009/0074565 A1 | 3/2009 | Suciu et al. |
| 2009/0080700 A1 | 3/2009 | Lau et al. |
| 2009/0090096 A1 | 4/2009 | Sheridan |
| 2009/0092480 A1 | 4/2009 | Kupratis |
| 2009/0092494 A1 | 4/2009 | Cairo et al. |
| 2009/0094961 A1 | 4/2009 | Stern |
| 2009/0097967 A1 | 4/2009 | Smith et al. |
| 2009/0145102 A1 | 6/2009 | Roberge et al. |
| 2009/0151317 A1 | 6/2009 | Norris et al. |
| 2009/0183512 A1 | 7/2009 | Suciu et al. |
| 2009/0229242 A1 | 9/2009 | Schwark |
| 2009/0245997 A1 | 10/2009 | Hurwitz et al. |
| 2009/0266912 A1 | 10/2009 | Gukeisen |
| 2009/0288384 A1 | 11/2009 | Granitz et al. |
| 2009/0293445 A1 | 12/2009 | Ress, Jr. |
| 2009/0304518 A1 | 12/2009 | Kodama et al. |
| 2009/0314881 A1 | 12/2009 | Suciu et al. |
| 2009/0317229 A1 | 12/2009 | Suciu et al. |
| 2009/0320488 A1 | 12/2009 | Gilson et al. |
| 2010/0005778 A1 | 1/2010 | Chaudhry |
| 2010/0005810 A1 | 1/2010 | Jarrell et al. |
| 2010/0007207 A1 | 1/2010 | Peuser |
| 2010/0080700 A1 | 4/2010 | Venter |
| 2010/0089019 A1 | 4/2010 | Knight et al. |
| 2010/0105516 A1 | 4/2010 | Sheridan et al. |
| 2010/0126141 A1 | 5/2010 | Schilling |
| 2010/0132376 A1 | 6/2010 | Durocher et al. |
| 2010/0132377 A1 | 6/2010 | Durocher et al. |
| 2010/0135786 A1 | 6/2010 | Manteiga et al. |
| 2010/0148396 A1 | 6/2010 | Xie et al. |
| 2010/0154384 A1 | 6/2010 | Schilling |
| 2010/0162683 A1 | 7/2010 | Grabowski et al. |
| 2010/0212281 A1 | 8/2010 | Sheridan |
| 2010/0218478 A1 | 9/2010 | Merry et al. |
| 2010/0218483 A1 | 9/2010 | Smith |
| 2010/0219779 A1 | 9/2010 | Bradbrook |
| 2010/0301617 A1 | 12/2010 | Lundbladh |
| 2010/0326050 A1 | 12/2010 | Schilling et al. |
| 2010/0331139 A1 | 12/2010 | McCune |
| 2011/0056208 A1 | 3/2011 | Norris et al. |
| 2011/0081237 A1 | 4/2011 | Durocher et al. |
| 2011/0106510 A1 | 5/2011 | Poon |
| 2011/0116510 A1 | 5/2011 | Breslin et al. |
| 2011/0130246 A1 | 6/2011 | McCune et al. |
| 2011/0149624 A1 | 6/2011 | Yamanaka |
| 2011/0159797 A1 | 6/2011 | Beltman et al. |
| 2011/0165983 A1 | 7/2011 | Fox |
| 2011/0208400 A1 | 8/2011 | Lickfold et al. |
| 2011/0286836 A1 | 11/2011 | Davis |
| 2011/0293423 A1 | 12/2011 | Bunker et al. |
| 2012/0007431 A1 | 1/2012 | Jang et al. |
| 2012/0017603 A1 | 1/2012 | Bart et al. |
| 2012/0124964 A1 | 5/2012 | Hasel et al. |
| 2012/0171018 A1 | 7/2012 | Hasel et al. |
| 2012/0263578 A1 | 10/2012 | Davis et al. |
| 2012/0291449 A1 | 11/2012 | Adams et al. |
| 2013/0011547 A1 | 1/2013 | Girard et al. |
| 2013/0115476 A1 | 5/2013 | Castle et al. |
| 2013/0186058 A1 | 7/2013 | Sheridan et al. |
| 2013/0192191 A1 | 8/2013 | Schwarz et al. |
| 2013/0192196 A1 | 8/2013 | Suciu et al. |
| 2013/0192200 A1 | 8/2013 | Kupratis et al. |
| 2013/0192201 A1 | 8/2013 | Kupratis et al. |
| 2013/0192258 A1 | 8/2013 | Kupratis et al. |
| 2013/0192263 A1 | 8/2013 | Suciu et al. |
| 2013/0192266 A1 | 8/2013 | Houston et al. |
| 2013/0195621 A1 | 8/2013 | Schwarz et al. |
| 2013/0195648 A1 | 8/2013 | Schwarz et al. |
| 2013/0219913 A1 | 8/2013 | McCune et al. |
| 2013/0223986 A1 | 8/2013 | Kupratis et al. |
| 2013/0224003 A1 | 8/2013 | Kupratis et al. |
| 2013/0255219 A1 | 10/2013 | Schwarz et al. |
| 2013/0259650 A1 | 10/2013 | Schwarz et al. |
| 2013/0259653 A1 | 10/2013 | Schwarz et al. |
| 2013/0259654 A1 | 10/2013 | Kupratis et al. |
| 2013/0283819 A1 | 10/2013 | Schwarz et al. |
| 2013/0287575 A1 | 10/2013 | McCune et al. |
| 2013/0292196 A1 | 11/2013 | Ooka |
| 2013/0310213 A1 | 11/2013 | Matsuoka et al. |
| 2013/0318998 A1 | 12/2013 | Schwarz et al. |
| 2013/0331223 A1 | 12/2013 | McCune et al. |
| 2013/0331224 A1 | 12/2013 | McCune et al. |
| 2013/0336791 A1 | 12/2013 | McCune et al. |
| 2014/0020404 A1 | 1/2014 | Sheridan et al. |
| 2014/0109548 A1 | 4/2014 | Virkler |
| 2014/0130479 A1 | 5/2014 | Schwarz et al. |
| 2014/0133958 A1 | 5/2014 | McCune et al. |
| 2014/0140819 A1 | 5/2014 | McCune et al. |
| 2014/0174056 A1 | 6/2014 | Suciu et al. |
| 2014/0196472 A1 | 7/2014 | Kupratis et al. |
| 2014/0234079 A1 | 8/2014 | McCune et al. |
| 2014/0271135 A1 | 9/2014 | Sheridan et al. |
| 2015/0089959 A1 | 4/2015 | Merry et al. |
| 2015/0096303 A1 | 4/2015 | Schwarz et al. |
| 2015/0121844 A1 | 5/2015 | Kupratis et al. |
| 2016/0032826 A1 | 2/2016 | Rued et al. |
| 2017/0335718 A1 | 11/2017 | McCune et al. |

FOREIGN PATENT DOCUMENTS

| | | |
|---|---|---|
| CN | 1952367 A | 4/2007 |
| EP | 0253548 A2 | 1/1988 |
| EP | 0791383 A1 | 8/1997 |
| EP | 1142850 A1 | 10/2001 |
| EP | 1340902 A2 | 9/2003 |
| EP | 1403500 A1 | 3/2004 |
| EP | 1577491 A1 | 9/2005 |
| EP | 1607574 A1 | 12/2005 |
| EP | 1703085 A2 | 9/2006 |
| EP | 1712738 A2 | 10/2006 |
| EP | 1777370 A2 | 4/2007 |
| EP | 1921253 A2 | 5/2008 |
| EP | 1921290 A2 | 5/2008 |
| EP | 2071139 A2 | 6/2009 |
| EP | 2071153 A2 | 6/2009 |
| EP | 2192269 A2 | 6/2010 |
| EP | 2192273 A2 | 6/2010 |
| EP | 2270315 A2 | 1/2011 |
| EP | 2270361 A2 | 1/2011 |
| EP | 2532841 A2 | 12/2012 |
| EP | 2532858 A2 | 12/2012 |
| EP | 2551488 A2 | 1/2013 |
| EP | 2551489 A2 | 1/2013 |
| EP | 2809575 A1 | 12/2014 |
| EP | 2809931 A1 | 12/2014 |
| EP | 2809934 A2 | 12/2014 |
| EP | 2809939 A2 | 12/2014 |
| EP | 2809953 A1 | 12/2014 |
| EP | 2811120 A1 | 12/2014 |
| EP | 2841718 A2 | 3/2015 |
| EP | 2896785 A1 | 7/2015 |
| EP | 2949881 A1 | 12/2015 |
| EP | 2532841 B1 | 4/2016 |
| EP | 3032084 A1 | 6/2016 |
| EP | 2809931 B1 | 7/2016 |

(56) References Cited

FOREIGN PATENT DOCUMENTS

| EP | 3070315 A1 | 9/2016 |
|---|---|---|
| EP | 3070316 A1 | 9/2016 |
| FR | 2563865 A1 | 11/1985 |
| FR | 2912181 A1 | 8/2008 |
| GB | 745239 A | 2/1956 |
| GB | 1516041 A | 6/1978 |
| GB | 2041090 A | 9/1980 |
| GB | 2419639 A | 5/2006 |
| GB | 2426792 A | 12/2006 |
| GB | 2419639 B | 9/2009 |
| JP | 857171032 A | 10/1982 |
| JP | 2014156861 A | 8/2014 |
| WO | 2007038674 A1 | 4/2007 |
| WO | 2010030724 A1 | 3/2010 |
| WO | 2013102191 A1 | 7/2013 |
| WO | 2013116257 A1 | 8/2013 |
| WO | 2013116262 A1 | 8/2013 |
| WO | 2013154636 A1 | 10/2013 |
| WO | 2014018142 A2 | 1/2014 |
| WO | 2014028085 A2 | 2/2014 |
| WO | 2014047040 A1 | 3/2014 |
| WO | 2015031143 A1 | 3/2015 |
| WO | 2015156885 A2 | 10/2015 |

OTHER PUBLICATIONS

Response to Opposition for European Patent No. EP2949882 (EP Application No. 15175205.2) dated Nov. 26, 2018.
Response to Opposition -opposed by Rolls Royce. EP Patent No. 3045684 Application No. 16159312.4 Jul. 5, 2021.
Response to Opposition -opposed by Rolls Royce EP Patent No. 3098396 Application No. 16174051.9 Jul. 5, 2021.
Response to Statement of Grounds of Appeal from the Patent Holder for European Patent No. 2809931 by Safran Aircraft Engine dated Aug. 21, 2019. [with English translation].
Response to the Observations Filed by Patent Holder for European Patent No. EP2809922, dated Apr. 29, 2020.
Response to the Summons of Oral Proceedings for European Patent No. EP2949882 by Rolls-Royce, dated Oct. 9, 2019.
Response to the Summons of Oral Proceedings for European Patent No. EP2949882 by Safran, dated Oct. 9, 2019.
Response to the Summons of Oral Proceedings for European Patent No. EP3051078 by Rolls-Royce, dated Oct. 17, 2019.
Response to the Summons to Oral Proceedings in European Patent Application No. 15175203.7(EP2949881) by Rolls-Royce plc dated Mar. 25, 2021. pp. 1-9.
Response to the Summons to Oral Proceedings in EuropeanPatent Application No. 15175203.7 (EP2949881) by Safran dated Mar. 25, 2021.pp. 1-11.
Rethinking jet engines to make commercial aviation less of a threat to the climate (and the human respiratory system). Fortune. Retrieved Sep. 29, 2016 from: http://beta.fortune.com/change-the-world/united-technologies-8.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Reynolds, C.N., "Advanced prop-fan engine technology (APET) single- and counter-rotation gearbox/pitch change mechanism," Prepared for NASA, NASA CR-168114 (vol. II), Jul. 1985, pp. 1-175.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
Rolls-Royce M45H. Jane's Aero-engines, Aero-engines—Turbofan. Feb. 24, 2010.
"Rolls-Royce Trent 900," Jane's Aero-Engines, Jane's by IHS Markit, Feb. 8, 2012.
"Rolls-Royce Trent XWB," Jane's Aero-Engines, Jane's by IHS Markit, Mar. 6, 2012.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France. pp. 1-595.
Roux E., "Turbofan and turbojet engines database handbook," Editions Elodie Roux, Blagnac: France, 2007, pp. 41-43 and 464-469.
Roux E., "Turbofan and turbojet engines database handbook", Editions Elodie Roux. Blagnac: France, 2007, pp. 41-42, pp. 465, pp. 468-469.
Sabnis, J. (2010). The PW1000G PurePower new engine concept and its impact on MRO. Av Week Engine MRO Forum. Dec. 1, 2010. pp. 1-45.
Sabnis J.S. (2005). Emissions and noise—Next frontier for aircraft engine technologies. Presented at the AIAA/ AAAF Aircraft Noise and Emissions Reduction Symposium. Monterey, California, USA. May 24-26, 2005.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report-168113. R83AEB592. Jun. 1, 1985. pp. 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Schaber Reinhold, "Numerische Auslegung und Simulation von Gasturbinen," Dec. 14, 2000, 115 pages.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Seader, J.D. and Henley, E.J. (1998). Separation process principles. New York, NY: John Wiley Sons, Inc. pp. 722-726 and 764-771.
Sessions R., "Turbo Hydra-Malic 350 Handbook", 1985, The Berkley Publishing Group, pp. 24-25.
Shah, D.M. (1992). MoSi2 and other silicides as high temperature structural materials. Superalloys 1992. The Minerals, Metals, Materials Society. pp. 409-422.
Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singapore Search Report and Written Opinion for Application No. 10201401514U, dated May 26, 2017, 15 pages.
Singapore Search Report and Written Opinion for Application No. SG10201706005S, dated Feb. 15, 2018, 11 pages.
Singapore Search Report and Written Opinion for Application No. SG11201402667Q dated May 19, 2015.
Singapore Search Report and Written Opinion for Application No. SG11201402824R dated Apr. 19, 2016.
Singapore Search Report and Written Opinion for Application No. SG11201402942Q dated Mar. 4, 2015, 28 pages.
Singapore Search Report and Written Opinion for Application No. SG11201403011R, dated Nov. 17, 2015, 14 pages.
Singapore Search Report and Written Opinion for Application No. SG11201403015W dated Jun. 9, 2015.
Singapore Search Report and Written Opinion for Application No. SG11201403118S, dated Apr. 20, 2015, 29 pages.
Singapore Search Report for Application No. SG11201403615Q dated Jan. 4, 2016.
Singh, A. (2005). Application of a system level model to study the planetary load sharing behavior. Jounal of Mechanical Design. vol. 127. May 2005. pp. 469-476.
Singh, Avinash, Load Sharing Behavior in EpicyclicGears:Physical Explanation and Generalized Formulation. Mechanism and MachineTheory, vol. 45. 2010, 20 pgs.
Singh, B. (1986). Small engine component technology (SECT) study. NASA CR-175079. Mar. 1, 1986. pp. 1-102.

(56) References Cited

OTHER PUBLICATIONS

Singh, R. and Houser, D.R. (1990). Non-linear dynamic analysis of geared systems. NASA-CR-180495. Feb. 1, 1990. pp. 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Smith Jr M.G., et al., "P&W propulsion systems studies results/status," National Aeronautics and Space Administration First Annual High Speed Research Workshop, May 14-16, 1991, pp. 921-948.
Smith-Boyd, L. and Pike, J. (1986). Expansion of epicyclic gear dynamic analysis program. Prepared for NASA. NASA CR-179563. Aug. 1986. pp. 1-98.
International Preliminary Report on Patentability for International Application No. PCT/US2013/022378, dated Aug. 14, 2014, 9 pages.
International Preliminary Report on Patentability for International Application No. PCT/US2013/060105, dated Apr. 2, 2015, 6 pages.
International Preliminary Report on Patentability for International Application No. PCT/US2015/012346 dated Aug. 4, 2016.
International Preliminary Report on Patentability for PCT Application No. PCT/US2013/034518 dated Oct. 16, 2014.
International Preliminary Report on Patentability for PCT Application No. PCT/US2013/037675, dated Nov. 6, 2014, 13 pages.
International Preliminary Report on Patentability of PCT Application No. PCT/US2013/023559, dated Aug. 14, 2014, 7 pages.
International Preliminary Report on Patentability of PCT Application No. PCT/US2013/023715, dated Aug. 14, 2014, 8 pages.
International Preliminary Report on Patentability of PCT Application No. PCT/US2013/023719, dated on Aug. 14, 2014, 6 pages.
International Preliminary Report on Patentability of PCT Application No. PCT/US2013/023724, dated Aug. 14, 2014, 9 pages.
International Preliminary Report on Patentability of PCT Application No. PCT/US2013/023730, dated Aug. 14, 2014, 13 pages.
International Search Report and Written Opinion for PCT Application No. PCT/US2013/021878, dated Mar. 13, 2013, 10 pages.
International Search Report and Written Opinion for PCT Application No. PCT/US2013/022388, dated Dec. 30, 2013.
International Search Report and Written Opinion for PCT Application No. PCT/US2013/023559 dated Nov. 5, 2013.
International Search Report and Written Opinion for PCT Application No. PCT/US2013/023603, dated Aug. 27, 2013, 13 pages.
International Search Report and Written Opinion for PCT Application No. PCT/US2013/023715, dated Aug. 20, 2013, 10 pages.
International Search Report and Written Opinion for PCT Application No. PCT/US2013/023719 dated Apr. 4, 2013.
International Search Report and Written Opinion for PCT Application No. PCT/US2013/023724, dated Mar. 26, 2013, 11 pages.
International Search Report and Written Opinion for PCT Application No. PCT/US2013/023730, dated Mar. 12, 2013, 14 pages.
International Search Report and Written Opinion for PCT Application No. PCT/US2013/034518, dated Nov. 22, 2013, 8 pages.
International Search Report and Written Opinion for PCT Application No. PCT/US2013/037675 dated Mar. 7, 2014.
International Search Report and Written Opinion for PCT Application No. PCT/US2013/060105 dated Feb. 19, 2014.
International Search Report and Written Opinion from parent counterpart PCT Application PCT/US2013/022378, dated Sep. 13, 2013, 10 pages.
Ivchenko-Progress AI-727M. Jane's Aero-engines, Aero-engines—Turbofan. Nov. 27, 2011.
Ivchenko-Progress D-436. Jane's Aero-engines, Aero-engines—Turbofan. Feb. 8, 2012.
Ivchenko-Progress D-727. Jane's Aero-engines, Aero-engines—Turbofan. Feb. 7, 2007.
Jacobson, N.S. (1993). Corrosion of silicon-based ceramics in combustion environments. J. Am. Ceram. Soc. 76(1). pp. 3-28.
"Jane's Aero-Engines", Edited by Bill Gunston, Jane's Information Group Inc., Alexandria, Virginia, 2000, Issue Seven, pp. 1-67, 464-470, 475-476, 482-488, 494-508, 510-512.
Jeng, Y.- L., Lavernia, E.J. (1994). Processing of molybdenum disilicide. J. of Mat. Sci. vol. 29. 1994. pp. 2557-2571.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study-final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week Space Technology, 148(8). p. 34-5.
Kandebo, S.W. (1998). Geared-Turbofan engine design targets cost, complexity. Aviation Week & Space Technology, 148(8). p. 34-5.
Kandebo, S.W. (1998). Pratt & Whitney launches geared turbofan engine. Aviation Week Space Technology, 148(8). p. 32-4.
Kang M.R. (2009). Measurement of vibrations of gears supported by compliant shafts. Ohio University. Retrieved Oct. 7, 2019 from https://etd.ohiolink.edu/letd.send_fileaccession=osu1253021230 &disposition=attachment.
Kapelevich, "High Gear Ratio Epicyclic Drives Analysis," Jun. 2014, American Gear Manufacturers Association, geartechnology.com , pp. 62-67.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kellner T., "The World's Largest Jet Engine is Already More Powerful than America's First Manned Space Rocket," GE Reports, May 19, 2016, [Retrieved on Oct. 12, 2017], Retrieved from the Internet: URL: https://www.ge.com/reports/the-worlds-largest-jet-engine-is-already-more-powerful-than-americas-first-manned-space-rocket/.
Kerrebrock, J.L. (1977). Aircraft engines and gas turbines. Cambridge, MA: The MIT Press. p. 11.
Kiekbusch T., et al., "A common formula for the combined torsional mesh stiffness of spur gears", 5th Australasian Congress on Applied Mechanics, ACAM 2007, Dec. 10-12, 2007, pp. 1-7.
Kjelgaard, C. (2010). Gear up for the GTF. Aircraft Technology, 105. Apr.-May 2010. pp. 86, 88, 90, 92-95.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Krantz, T.L. (1990). Experimental and analytical evaluation of efficiency of helicopter planetary stage. NASA Technical Paper. Nov. 1990. pp. 1-19.
Krauskopf, L. Shumaker, L. (2014). GE exec says avoided geared design in jet engine battle with Pratt. Reuters. Sep. 15, 2014. http://www.reuters.com/article/us-general-electric-united-tech-engine-idUSKBN0HA2H620140915.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.

(56) References Cited

OTHER PUBLICATIONS

Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air. 2009, Orlando, Florida. pp. 145-153.
Kurzke, J. (2012). GasTurb 12: Design and off-design performance of gas turbines. Retrieved from: https://www.scribd.com/document/153900429/GasTurb-12.
Lacaze J., et al., "Directionally Solidified Materials: Nickel-Base Superalloys for Gas Turbines," Textures and Microstructures, 1990, vol. 13, pp. 1-14.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Le Borzec, R. (1992). Reducteurs de vitesse a engrenages. Techniques de l'Igenieur. Nov. 10, 1992. pp. 1-36.
Leckie, F.A. and Dal Bello, D.J. (2009). Strength and stiffness of engineering systems. Mechanical Engineering Series. Springer. pp. 1-10, 48-51.
Leckie F.A., et al., "Strength and Stiffness of Engineering Systems," Mechanical Engineering Series, Springer, 2009, pp. 1-3.
Lee, K.N. (2000). Current status of environmental barrier coatings for Si-Based ceramics. Surface and Coatings Technology 133-134, 2000. pp. 1-7.
Letter from the Opponent for European Patent Application No. 2811120 (14155460.0) dated Feb. 15, 2019 by Safran Aircraft Engines.
Letter from the Opponent (Safran) for European Patent 2809939 (13786893.1) dated Aug. 13, 2020.
Letter from the Opponent (Safran) for European Patent 2949881 (15175203.74) dated Mar. 25, 2021.
Levintan, R.M. (1975). Q-Fan demonstrator engine. Journal of Aircraft. vol 12( 8). Aug. 1975. pp. 658-663.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W et al. (1995). Advanced subsonic airplane design economics studies. NASA CR-195443. Apr. 1995. pp. 1-187.
Litt, J.S. (2018). Sixth NASA Glenn Research Center propulsion control and diagnostics (PCD) workshop. NASA/CP-2018-219891. Apr. 1, 2018. pp. 1-400.
Lord, W.K., MacMartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.
Lynwander P., "Gear Drive Systems: Design and Application," American Lohmann Corporation, New Jersey, 1983, Marcel Dekker Inc., NY and Basel, GE-1018.008, paragraphs 2-4, p. 327.
Macisaac, B. and Langston, R. (2011). Gas turbine propulsion systems. Chichester, West Sussex: John Wiley & Sons, Ltd. pp. 260-265.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Manual. Student's Guide to Learning SolidWorks Software. Dassault Systemes—SolidWorks Corporation. pp. 1-156.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.
Mattingly, J.D. (1996). Elements of gas turbine propulsion. New York, New York: McGraw-Hill, Inc. pp. 8-15.
Mattingly J.D., "Aircraft Engine Design," American Institute of Aeronautics and Astronautics Inc, 2nd Edition, Jan. 2002, pp. 292-322.
Mattingly J.D., "Elements of Gas Turbine Propulsion", New York, New York: McGraw-Hill, Inc. preface, 1996, pp. 719-720, 727-731, 735-738, 928-929, and 936-937.
Mattingly J.D., et al., "Aircraft Engine Design", American Institute of Aeronautics and Astronautics Inc, 2nd ed, 2002, XP008175104, ISBN 1-56347-538-3, pp. 292-310.
Mattingly, J.D, Heiser, W.H., Boyer, K.M., Haven, B.A., and Pratt, D.T. (2002). Aircraft engine design. American Institute of Aeronautics and Astronautics Inc, 2nd ed, 2002, XP008175104, ISBN 1-56347-538-3, pp. 290-292.
Mattingly, Textbook, XP008174593, pp. 292.
Mavris, D.N., Schutte, J.S. (2016). Application of deterministic and probabilistic system design methods and enhancements of conceptual design tools for ERA project final report. NASA/CR-2016-219201. May 1, 2016. pp. 1-240.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
McCracken, R.C. (1979). Quiet short-haul research aircraft familiarization document. NASA-TM-81149. Nov. 1, 1979. pp. 1-76.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Meier N. (2005) Civil Turbojet/Turbofan Specifications. Retrieved from http://jet-engine.net/civtfspec.html.
Merriam-Webster's collegiate dictionary, 10th Ed. (2001). p. 1125-1126.
Merriam-Webster's collegiate dictionary, 11th Ed. (2009). p. 824.
Meyer, A.G. (1988). Transmission development of TEXTRON Lycoming's geared fan engine. Technical Paper. Oct. 1988. pp. 1-12.
Middleton, P. (1971). 614: VFW's jet feederliner. Flight International, Nov. 4, 1971. p. 725, 729-732.
Misel, O.W. (1977). QCSEE main reduction gears test program. NASA CR-134669. Mar. 1, 1977. pp. 1-222.
Moxon, J. How to save fuel in tomorrow's engines. Flight International. Jul. 30, 1983. 3873(124). pp. 272-273.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Munt, R. (1981). Aircraft technology assessment: Progress in low emissions engine. Technical Report. May 1981. pp. 1-171.
Nagendra S., et al., "Optimal rapid multidisciplinary response networks: RAPIDDISK," Structural and Multidisciplinary Optimization, Springer, Berlin, DE, vol. 29, No. 3, Mar. 1, 2005, pp. 213-231.
Nanocor Technical Data for Epoxy Nanocomposites using Nanomer 1.30E Nanoclay. Nnacor, Inc. Oct. 2004.

(56) References Cited

OTHER PUBLICATIONS

NASA Conference Publication. (1978). CTOL transport technology. NASA-CP-2036-PT-1. Jun. 1, 1978. pp. 1-531.

Declaration of Reza Abhari. In re U.S. Pat. No. 8,695,920. Executed Nov. 30, 2016, pp. 1-67.

Declaration of Reza Abhari, Ph.D. In re U.S. Pat. No. 8,844,265, Executed Jun. 28, 2016, pp. 1-91.

Defeo, A. and Kulina, M. (1977). Quiet clean short-haul experimental engine (QCSEE) main reduction gears detailed design final report. Prepared for NASA. NASA-CR-134872. Jul. 1977. pp. 1-157.

Deventer O.V., "Extreme Reduction—11 Million to One Gearing," Shapeways.com, [Retrieved on Nov. 13, 2017], https://www.shapeways.com/product/EQJQZEVWU/extreme-reduction-11-million-to-one-gearing.

Diagram of Prior Art V2500 and PW4090 Engines, 1 page.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

*Dr. Raymond G. Tronzo v. Biomet Inc.* 156 F.3d 1154, 1998.

Drago, R.J. (1974). Heavy-lift helicopter brings up drive ideas. Power Transmission Design. Mar. 1987. pp. 1-15.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Du S., "Modelling of Spur Gear Mesh Stiffness and Static Transmission Error", 1998, Proc Instn Mech Engrs, vol. 212, Part C, 11 pages.

Dudley, D.W., Ed. (1954). Handbook of practical gear design. Lancaster, PA: Technomic Publishing Company, Inc. pp. 3.96-102 and 8.12-18.

Dudley, D.W., Ed. (1962). Gear handbook. New York, NY: McGraw-Hill. pp. 14-17 (TOC, Preface, and Index).

Dudley, D.W., Ed. (1962). Gear handbook. New York, NY: McGraw-Hill. pp. 3.14-3.18 and 12.7-12.21.

Dudley, D.W., Ed. (1994). Practical gear design. New York, NY: McGraw-Hill. pp. 119-124.

EASA Type-Certificate Data Sheet for PW1500G Series Engines. Feb. 24, 2021. pp. 1-17.

"EASA Type-Certificate Data Sheet RB211 Trent 800 Series Engines," EASA, TCDS E.047, Issue 02, Oct. 10, 2013.

Edkins, D.P., Hirschkron, R., and Lee, R. (1972). TF34 turbofan quiet engine study. Final Report prepared for NASA. NASA-CR-120914. Jan. 1, 1972. pp. 1-99.

Edwards, T. and Zabarnick, S. (1993). Supercritical fuel deposition mechanisms. Ind. Eng. Chem. Res. vol. 32. 1993. pp. 3117-3122.

El-Sayad, A.F. (2008). Aircraft propulsion and gas turbine engines. Boca Raton, FL: CRC Press. pp. 215-219 and 855-860.

Engber, M., Klaus, R., Ardey, S., Gier, J., and Waschka, W. (2007). Advanced technologies for next generation regional jets—Survey of research activities at MTU Aero Engines. Proceedings: XVIII International Symposium on Air Breathing Engines (ISABE). 18th ISABE Conference. Beijing, China. Sep. 2-7, 2007. pp. 1-11.

Engine Alliance GP7200. Jane's Aero-Engines. Jane's by IHS Markit. Jul. 12, 2010.

English Translation of Measurement and Calculation Methodology on TFE731-2, TFE731-3A and TFE731-3D Models, 14 pages.

EP Office Action for Application No. EP16159312.4, dated Oct. 16, 2018, 10 pages.

EP Office Action for Application No. EP16174051.9, dated Oct. 15, 2018, 28 pages.

EP Office Action for Application No. EP17199484.1, dated Jan. 2, 2019, 5 pages.

Epstein, A. (2015). The Pratt Whitney PurePower Geared Turbofan engine. Academie de l'Air et de l'Espace. Paris. Sep. 2015. pp. 1-27.

European Aviation Safety Agency, Type-Certificate Data Sheet for PW1500G Series Engines, No. M.E.090, Dec. 6, 2016, pp. 1-14.

European Extended Search Report for Application No. EP19199343.5, dated Jan. 10, 2020, 8 pages.

European Search Report for Application No. EP12170479.5 dated Jun. 26, 2014.

European Search Report for Application No. EP12170483.7 dated Apr. 29, 2014.

European Search Report for Application No. EP13743042.7, dated Aug. 14, 2015, 9 pages.

European Search Report for Application No. EP13743283.7, dated Oct. 5, 2015, 8 pages.

European Search Report for Application No. EP13744335.4, dated Oct. 6, 2015, 9 pages.

European Search Report for Application No. EP13775188.9 dated Aug. 11, 2015.

European Search Report for Application No. EP13777804.9, dated Oct. 20, 2015, 9 pages.

European Search Report for Application No. EP13778330.4, dated Oct. 15, 2015, 7 pages.

European Search Report for Application No. EP13786893.1 dated Oct. 12, 2015, 7 pages.

European Search Report for Application No. EP13828967.3, dated Oct. 14, 2014, 3 pages.

European Search Report for Application No. EP14155460.0, dated Sep. 2, 2014, 9 pages.

European Search Report for Application No. EP15152745.4, dated Jun. 15, 2015, 7 pages.

European Search Report for Application No. EP15175203.7 dated Oct. 15, 2015.

European Search Report for Application No. EP15175205.2 dated Oct. 15, 2015.

European Search Report for Application No. EP15199577.6, dated May 4, 2016, 10 pages.

European Search Report for Application No. EP15199916.6, dated May 4, 2016, 9 pages.

European Search Report for Application No. EP15777258.3 dated Apr. 10, 2017.

European Search Report for Application No. EP16150651.4, dated May 24, 2016, 7 pages.

European Search Report for Application No. EP16159312.4 dated Jun. 8, 2016.

European Search Report for Application No. EP16161464.9, dated Jul. 22, 2016, 9 pages.

European Search Report for Application No. EP16161484.7, dated Jul. 22, 2016, 8 pages.

European Search Report for Application No. EP16170111.5 dated Dec. 12, 2016.

NASA Conference Publication. Quiet, powered-lift propulsion. Cleveland, Ohio. Nov. 14-15, 1978. pp. 1-420.

NASA Contractor Report. Energy efficient engine component development and integration program. NASA-CR-172846. Apr. 30, 1982. pp. 1-151.

NASA, Engine Weight Model, Glenn Research Center, Retrieved from, http://www.grc.nasa.gov/WWW/K-12/airplane/turbwt.html, Mar. 11, 2016.

NASA Lewis Research Center, Quiet Clean Short HaulExperimental Engine (QCSEE) Main Reduction Gears Detailed Design Final report. NASA CR_134872, Mar. 1975. 222 pgs.

NASA, Quest for Performance: The Evolution of Modem Aircraft, Part II: The Jet Age, Chapter 10: Technology of the Jet Airplane, Turbo jet and Turbofan Systems, Dec. 2006, NASA.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.

Norton, M. and Karczub, D. (2003). Fundamentals of noise and vibration analysis for engineers. Press Syndicate of the University of Cambridge. New York: New York. p. 524.

(56) References Cited

OTHER PUBLICATIONS

Notice of Opposition by Rolls Royce of European Patent No. 2809939 (European Patent Application No. 13786893.1) dated Sep. 26, 2018, 30 pages.
Notice of Opposition for European Patent No. 2809922 (13778330.4) dated Mar. 18, 2019 by Rolls-Royce plc.
Notice of Opposition for European Patent No. 2809922 (13778330.4) dated Mar. 20, 2019 by Safran Aircraft Engines.
Notice of Opposition for European Patent No. 2809932 (13743283.7) dated Sep. 20, 2018 by Safran Aircraft Engines.
Notice of Opposition for European Patent No. 2949882 (15175205.2) dated May 23, 2018 by Safran Aircraft Engines.
Notice of Opposition for European Patent No. 2949882 (15175205.2) dated May 22, 2018 by Rolls-Royce, 18 pages.
Notice of Opposition for European Patent No. EP3051078 dated Jul. 31, 2018, 45 pages.
Notice of Opposition from Rolls Royce for Application No. 16159312.4 (Patent No. EP3045684) dated Dec. 14, 2020. 23 pgs.
Notice of Opposition from Rolls Royce for Application No. 16174051.9 (Patent No. EP3098396) dated Dec. 14, 2020. 24 pgs.
Notice of Opposition of European Patent Application No. EP13786893.1 (European Patent No. 2809939), by Safran Aircraft Engines, dated Sep. 20, 2018, 86 pages.
Notice of Opposition of European Patent Application No. EP13786893.1 (European Patent No. 2809939) by Safran Aircraft Engines dated Sep. 24, 2018.
Notice of Opposition of European Patent No. 2811120 (14155460.0), mailed Apr. 12, 2018 by Rolls-Royce, 74 pages.
Notice of Opposition of European Patent No. 2811120 (14155460.0), mailed Apr. 12, 2018 by Safran Aircraft Engines, 123 pages.
Notice of Opposition of European Patent No. EP2834469 by Safran Aircraft Engines dated Mar. 27, 2019. [with English translation].
Notice of Opposition of European Patent No. EP2949881, by Rolls-Royce dated May 28, 2019, 19 pages.
Notice of Opposition of European Patent No. EP2949881, by Safran Aircraft Engines, dated May 28, 2019, 87 pages.
Notice of Opposition submitted for EP Application No. 15175203.7 (Patent No. EP2949881) by Rolls Royce dated May 28, 2019.
Notice of Opposition to European Patent No. EP2809931 (EP13743042.7), United Technologies Corporation opposed by Safran Aircraft Engines dated Apr. 20, 2017. [with English translation].
Notice of Opposition to Patent No. EP2811120 (14155460.0) by Safran Aircraft Engines dated Apr. 12, 2018. [with English translation].
Oates, G.C. (Ed). (1989). Aircraft propulsion systems and technology and design. Washington, D.C.: American Institute of Aeronautics, Inc. pp. 341-344.
Opinion Under Section 74(a) for European Patent Application No. 2809922, mailed May 9, 2019.
Opposition—further submission filed for European Patent No. EP2949882, (EP Application No. 15175205.2) by Safran on Mar. 12, 2019. [with English translation].
Opposition Proceedings Rolls Submission 161593124 May 6, 22.
Opposition Response Safran for European Patent No. 2949882 (EP Application No. 15175205.2), dated Mar. 20, 2019, 78 pages.
Oppostion Proceedings Rolls Submission 161740519 May 6, 2022.
Parametric study of STOL short-haul transport engine cycles and operational techniques to minimize community noise impact. NASA-CR-114759. Jun. 1, 1974. pp. 1-397.
Parker, R.G. and Lin, J. (2001). Modeling, modal properties, and mesh stiffness variation instabilities of planetary gears. Prepared for NASA. NASA/CR-2001-210939. May 2001. pp. 1-111.
Patent Owner's Preliminary Response in U.S. Pat. No. 8,899,915, *General Electric Company*, Petitioner, v. *United Technologies Corp.*, Patent Owner. IPR2017-00522, Entered Apr. 19, 2017. pp. 1-54.
Peters A., et al., "Ultrashort Nacelles for Low Fan Pressure Ratio Propulsors", Journal of Turbomachinery, vol. 137 (2), Sep. 10, 2014, 16 pages.

Petition for Inter Partes Review of U.S. Pat. No. 8,297,916, *General Electric Company*, Petitioner, v. *United Technologies Corporation*, Patent Owner, IPR2018-01171, May 30, 2018.
Petition for Inter Partes Review of U.S. Pat. No. 8,297,916, *General Electric Company*, Petitioner, v. *United Technologies Corporation*, Patent Owner: IPR2018-01172, filed May 30, 2018, 83 pages.
Petition for Inter Partes Review of U.S. Pat. No. 8,899,915. *General Electric Company*, Petitioner, v. *United technologies Corporation*, Patent Owner. IPR2017-00522. Dec. 21, 2016, 72 pages.
Petition for Inter Partes Review of U.S. Pat. No. 9,695,751. *General Electric Company*, Petitioner, v. *United Technologies Corporation*, Patent Owner. IPR2018-01442. Filed Jul. 24, 2018.
Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.
Power Technology, "GE's H-Series Breaks 60% Fuel Efficiency Barrier", retrieved from internet https://www.power-technology.com/features/feature1084/, 2007, 8 pages.
Praisner, T.J., Grover, E., Mocanu, R., Jurek, R., and Gacek, R. (2010). Predictions of unsteady interactions between closely coupled HP and LP turbines with co-and counter-rotation. Proceedings of ASME Turbo Expo 2010. Jun. 14-18, 2018. Glasgow, UK. p. 1-10.
Pratt & Whitney PW2000, Jane's Aero-Engines: Jane's by IHS Markit, Sep. 29, 2010, 8 pages.
Pratt & Whitney PW6000, "Jane's Aero-Engines", Jane's by IHS Markit, Nov. 22, 2010, 8 pages.
Pratt & Whitney PW1100G geared turbofan engine. The Flying Engineer. Retrieved Nov. 4, 2017 from: http://theflyingengineer.com/flightdeck/pw1100g-gtf/.
Pratt & Whitney PW8000. Jane's Aero-Engines. Jane's by IHS Markit. Sep. 30, 2010.
Preliminary Opinion of the Opposition Division in the opposition to patent EP2949882, dated Mar. 13, 2019, 12 pages.
European Search Report for Application No. EP16174051.9, dated Oct. 21, 2016, 10 pages.
European Search Report for Application No. EP16174322.4, dated Nov. 18, 2016, 9 pages.
European Search Report for Application No. EP16195861.6, dated Mar. 20, 2017, 9 pages.
European Search Report for Application No. EP16196567.8, dated Mar. 17, 2017, 8 pages.
European Search Report for Application No. EP16197349.0 dated Mar. 20, 2017, 7 pages.
European Search Report for Application No. EP16197814.3, dated Mar. 21, 2017, 9 pages.
European Search Report for Application No. EP17199484.1 dated Feb. 7, 2018.
European Search Report for Application No. EP17204160.0, dated on Mar. 22, 2018.
European Search Report for Application No. EP18191325.2 dated Mar. 7, 2019.
European Search Report for Application No. EP18191333.6 dated Mar. 7, 2019.
European Search Report for Application No. EP19179274.6, dated Sep. 3, 2019, 12 pages.
European Search Report for Application No. EP20162850.0 dated Aug. 18, 2020.
European Search Report for European Patent Application No. 20207411.8 dated Mar. 4, 2021.
Extended European Search Report for Application No. EP16155413.4 dated Jul. 5, 2016.
Extended European Search Report for Application No. EP17204153.5, dated Mar. 15, 2018.
Extended European Search Report for Application No. EP17210308.7, dated Apr. 19, 2018, 10 pages.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

(56) References Cited

OTHER PUBLICATIONS

Fanchon, J-L. (1994). Guide de sciences et technologies industrielles. Paris, France: Nathan, AFNOR. pp. 359-360.

File History for U.S. Appl. No. 12/131,876.

Final Written Decision. *General Electric Company*, Petitioner, v. *United Technologies Corp.*, Patent Owner. IPR2018-01442. U.S. Pat. No. 9,695,751. Entered Feb. 20, 2020. pp. 1-72.

Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.

Fitzpatrick G.A., et al., "Diffusion Bonding Aeroengine Components," Def Scie J , Oct. 1998 , vol. 38, Issue. 4, pp. 477-485.

Fitzpatrick G.A., et al., "The Rolls-Royce Wide Chord Fan Blade, Rolls-Royce Reporting," Mar. 19, 1987, pp. 1-19.

Fledderjohn, K.R. (1983). The TFE731-5: Evolution of a decade of business jet service. SAE Technical Paper Series. Business Aircraft Meeting Exposition. Wichita, Kansas. Apr. 12-15, 1983. pp. 1-12.

Foreign Copy and English Translation on the back of Opposition to European Patent No. EP3097275, granted Sep. 25, 2019, filed on behalf of Safran Aircraft Engines, dated Jul. 1, 2020.

Foreign Copy—Third Party Observation submitted by Safran for EP Application No. 14155460.0, Patent No. EP2811120, on Feb. 15, 2019, Translation to follow at a later date.

Fowler, T.W. Ed. (1989). Jet engines and propulsion systems for engineers. GE Aircraft Engines. Training and Educational Development and the University of Cincinnati for Human Resource Development. pp. 1-516.

Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.

Garder W.B., "Energy efficient engine flight propulsion system preliminary analysis and design report," NASA CR-159487, 1979, pp. 1-450.

Gardner W.B. (1979). Energy efficient engine: High pressure turbine uncooled rig technology report. NASA-CR-165149. Oct. 1979, pp. 1-242.

Garret TFE731 Turbofan Engine (Cat C). Chapter 79: Lubrciation System. TTFE731 Issue 2. 2010. pp. 1-24.

Gas Turbine Technology, "Introduction to a Jet Engine", Rolls-Royce plc, Dec. 2007.

Gates, D. Bombardier flies at higher market. Seattle Times. Jul. 13, 2008. pp. C6.

GE Reports (2009). GE's breakthrough GEnx debuts at the Paris Air Show. Retrieved Jun. 6, 2009 from: http://www.gereports.com/ges-breakthrough-genx-debuts-at-the-paris-air-show/.

General Electric CF34, "Jane's Aero-Engines", Jane's by IHS Markit, Jul. 26, 2010, 24 pages.

General Electric GE90, "Jane's Aero-Engines", Jane's by IHS Markit. Nov. 1, 2010, 12 pages.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Gliebe, P.R., Ho, P.Y., and Mani, R. (1995). UHB engine fan and broadband noise reduction study. NASA CR-198357. Jun. 1995. pp. 1-48.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Gray, D.E. (1978). Energy efficient engine preliminary design and integration studies. NASA-CP-2036-PT-1. Nov. 1978. pp. 89-110.

Gray, D.E. (1978). Energy efficient engine preliminary design and integration studies. Prepared for NASA. NASA CR-135396. Nov. 1978. pp. 1-366.

Gray, D.E. and Gardner, W.B. (1983). Energy efficient engine program technology benefit/cost study—vol. 2. NASA CR-174766. Oct. 1983. pp. 1-118.

Gray D.E., et al., "Energy Efficient Engine Program Technology Benefit/Cost Study vol. II," 1983, NASA, pp. 29-43.

Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.

Griffiths, B. (2005). Composite fan blade containment case. Modern Machine Shop. Retrieved from: http://www.mmsonline.com/articles/composite-fan-blade-containment-case pp. 1-4.

Grose T.K. (2013). Reshaping flight for fuel efficiency: Five technologies on the runway. National Geographic. Mar. 16, 2016. Retrieved Apr. 23, 2013 from: http://news.nationalgeographic.com/news/energy/2013/04/130423-reshaping-flight-for-fuel-efficiency.html.

Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.

Groweneweg, J.F. (1994). Fan noise research at NASA. Noise-CON 94. Fort Lauderdale, FL. May 1-4, 1994. pp. 1-10.

Grzegorz Litak., et al., "Dynamics of a Gear System with Faults in Meshing Stiffness," Nonlinear Dynamics, Kluwer Academic Publishers, DO, vol. 41, No. 4, Sep. 1, 2005, pp. 415-421.

Guha, "Optimum Fan Pressure Ratio for Bypass Engines with Separate or Mixed Exhaust Streams", Journal of Propulsion and Power, vol. 17, No. 5. Sep.- Oct. 2001, pp. 1117-1122, [retrieved on Aug. 21, 2013]. Retrieved from the Internet: http://www.facweb.iitkgp,ernet.in/.about.aguha/research/AIAA2001-. pdf>entire document.

Gunston B., "Allied Signal TFE731," Jane's Aero Engine Issue Five, Mar. 1999.

Gunston, B. (Ed.) (2000). Jane's aero-engines, Issue seven. Coulsdon, Surrey, UK: Jane's Information Group Limited. pp. 510-512.

Gunston, B. (Ed.)(2000). Jane's aero-engines. Jane's Information Group Inc. VA: Alexandria. Issue Seven pp. 1-47 and 510-512.

Gunston B., "Jane's Aero-engines", Issue Seven, Janes Information Group Inc, Alexandria, Virgina, 2000, pp. 1-47, 61, 464-512.

Gunston B., "Pratt & Whitney PW6000," Jane's Aero Engine Issue Six, Sep. 1999.

Gunston B., "The Cambridge Aerospace Dictionary," Second Edition, Cambridge University Press, Cambridge, UK, 2009, p. 543.

Guynn, M. D., Berton, J.J., Fisher, K. L., Haller, W.J., Tong, M. T., and Thurman, D.R. (2009). Analysis of turbofan design options for an advanced single-aisle transport aircraft. American Institute of Aeronautics and Astronautics. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Haldenbrand, R. and Norgren, W.M. (1979). Airesearch QCGAT program [quiet clean general aviation turbofan engines]. NASA-CR-159758. pp. 1-199.

Hall, C.A. and Crichton, D. (2007). Engine design studies for a silent aircraft. Journal of Turbomachinery, 129, 479-487.

Halle J.E., et al., "Energy Efficient Engine Fan Component Detailed Design Report," NASA-CR-165466, 1984, pp. 1-135.

Halliwell, I and Justice, K. (2012). Fuel burn benefits of a variable-pitch geared fan engine. AIAA 2012-3912. 48th AIAA/ASME/SAE/ASEE Joint Propulsion Conference & Exhibit. Jul. 30-Aug. 1, 2012. pp. 1-24.

Han, J., Dutta, S., and Ekkad, S.V. (2000). Gas turbine heat transfer and cooling technology. New York, NY: Taylor & Francis. pp. 1-25, 129-157, and 160-249.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

(56) References Cited

OTHER PUBLICATIONS

Hazlett, R.N. (1991). Thermal oxidation stability of aviation turbine fuels. Philadelphia, PA: ASTM. pp. 1-163.

Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.

Hendricks, E.S. and Tong, M.T. (2012). Performance and weight estimates for an advanced open rotor engine. NASA/TM-2012-217710. pp. 1-13.

Hendricks E.S., Jones, S.M., and Gray, J.S. (2014). Design optimization of a variable-speed power-turbine. American Institute of Aeronautics and Astronautics. pp. 1-17.

Hess, C. (1998). Pratt & Whitney develops geared turbofan. Flug Revue 43(7). Oct. 1998.

Hicks R.J., et al., "Optimised Gearbox Design for Modern Wind Turbines," Orbital2 Ltd, Wales, UK, Nov. 20, 2014, pp. 1-8.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Holcombe, V. (2003). Aero-Propulsion Technology (APT) task V low noise ADP engine definition study. NASA CR-2003-212521. Oct. 1, 2003. pp. 1-73.

Holder's Response to Written Opinion dated Sep. 29, 2015, European Patent Application No. 15175205.2 (2949882), dated Jun. 1, 2016, 27 pages.

Honeywell Learjet 31 and 35/36 TFE731-2 to 2C Engine Upgrade Program. Sep. 2005. pp. 1-4.

Honeywell LF502. Jane's Aero-engines, Aero-engines—Turbofan. Feb. 9, 2012.

Honeywell LF502. Jane's Aero-engines, Aero-engines—Turbofan. Aug. 17, 2016.

Honeywell LF507. Jane's Aero-engines, Aero-engines—Turbofan. Feb. 9, 2012.

Honeywell Sabreliner 65 TFE731-3 to -3D Engine Upgrade Program. Oct. 2005. pp. 1-4.

Honeywell TFE731. Jane's Aero-engines, Aero-engines—Turbofan. Jul. 18, 2012.

Honeywell TFE731 Pilot Tips. pp. 1-143.

Honeywell TFE731-5AR to -5BR Engine Conversion Program. Sep. 2005. pp. 1-4.

Horikoshi, S. and Serpone, N. (2013). Introduction to nanoparticles. Microwaves in nanoparticle synthesis. Wiley-VCH Verlag GmbH & Co. KGaA. pp. 1-24.

Howard, D.F. (1976). QCSEE preliminary under the wing flight propulsion system analysis report. NASA CR-134868. Feb. 1, 1976. pp. 1-260.

Howe, D.C. and Wynosky, T.A. (1985). Energy efficient engine program advanced turbofan nacelle definition study. NASA CR-174942. May 1, 1985. pp. 174.

Howe, D.C., and Wynosky, T.A. (1985). Energy efficient engine program advanced turbofan nacelle definition study. NASA-CR-174942. May 1985. pp. 1-60.

Howe, D.C., and Wynosky, T.A. (1985). Energy efficient engine program advanced turbofan nacelle definition study. NASA-CR-174942. May 1985. University of Washington dated Dec. 13, 1990. pp. 1-14.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Hughes, C. (2010). Geared turbofan technology. NASA Environmentally Responsible Aviation Project. Green Aviation Summit. NASA Ames Research Center. Sep. 8-9, 2010. pp. 1-8.

Interlocutory decision in opposition proceedings for European Patent Application No. 13743042.7 mailed Nov. 26, 2018.

Interlocutory decision in opposition proceedings for European Patent Application No. 13778330.4 mailed May 17, 2021.

International Organization for Standardization, "Calculation of Load Capacity of Spur and Helical Gears—Part 1: Basic Principles, Introduction and General Influence Factors (ISO/DIS Standard No. 6336-1)", 2006.

Bucknell, R.L. (1973). Influence of fuels and lubricants on turbine engine design and performance, fuel and lubircant analyses. Final Technical Report, Mar. 1971-Mar. 1973. pp. 1-252.

Bunker, R.S. (2005). A review of shaped hole turbine film-cooling technology. Journal of Heat Transfer vol. 127. Apr. 2005. pp. 441-453.

Carney, K., Pereira, M. Revilock, and Matheny, P. (2003). Jet engine fan blade containment using two alternate geometries. 4th European LS-DYNA Users Conference. pp. 1-10.

CFM International CFM56, Jane's Aero-Engines, Janes by IHS Markit, Jan. 31, 2011, 36 pages.

Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.

Cheryan, M. (1998). Ultrafiltration and microfiltration handbook. Lancaster, PA: Tecnomic Publishing Company, Inc. pp. 171-236.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Clarke, D.R. and Levi, C.G. (2003). Materials design for the next generation thermal barrier coatings. Annual. Rev. Mater. Res. vol. 33. 2003. pp. 383-417.

Co-pending U.S. Appl. No. 14/160,601, inventor Roberge et al., filed Jun. 11, 2009.

Coppinger, R. (2007). MTU Aero Engines designs High-Speed Turbine for P&W's GTF Geared Turbofan. Flight International. [accessed Oct. 13, 2017 at https://www.flightglobal.com/news/articles/mtu-aero-engines-designs-high-speed-turbine-for-pw-217631/].

Coy, Peter. The little gear that could reshape the jet engine: A simple idea's almost 30-year, $10 billion journey to the aircraft mainstream. Bloomberg Business. Oct. 15, 2015. p. 1-4.

Cramoisi, G. Ed. (2012). Death in the Potomac: The crash of Air Florida Flight 90. Air Crash Investigations. Accident Report NTSB/AAR-82-8. p. 45-47.

Cusick, M. (1981). Avco Lycoming's ALF 502 high bypass fan engine. Society of Automotive Engineers, Inc. Business Aircraft Meeting Exposition. Wichita, Kansas. Apr. 7-10, 1981. pp. 1-9.

Daggett, D.L., Brown, S.T., and Kawai, R.T. (2003). Ultra-efficient engine diameter study. NASA/CR-2003-212309. May 2003. pp. 1-52.

Dalton, III., W.N. (2003). Ultra high bypass ratio low noise engine study. NASA/CR-2003-212523. Nov. 2003. pp. 1-187.

Daly, M. Ed. (2008). Jane's Aero-Engine. Issue Twenty-three. Mar. 2008. p. 707-12.

Daly, M. Ed. (2010). Jane's Aero-Engine. Issue Twenty-seven. Mar. 2010. p. 633-636.

Damerau, J. (2014) What is the mesh stiffness of gears? Screen shot of query submitted by Vahid Dabbagh, answered by Dr. Jochan

(56) References Cited

OTHER PUBLICATIONS

Damerau, Research General Manager at Bosch Corp., Japan. Retrieved from: https://www.researchgate.net/post/What_is_the_mesh_stiffness_of_gears.
Darrah, S. (1987). Jet fuel deoxygenation. Interim Report for Period Mar. 1987-Jul. 1988. pp. 1-22.
Dassault Falcon 900EX Easy Systems Summary. Retrieved from: http://www.smartcockpit.com/docs/F900EX-Engines.pdf pp. 1-31.
Datasheet. CF6-80C2 high-bypass turbofan engines. Retreived from https://geaviation.com/sites/default/files/datasheet-CF6-80C2.pdf.
Datasheet. CFM56-5B for the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-617.
Decision Denying Institution of Inter Partes Review, *General Electric Company*, Petitioner v. *United technologies Corp.*, Patent Owner, IPR2017-00522, U.S. Pat. No. 8,899,915, Entered Jun. 23, 2017, pp. 1-18.
Decision Institution of Inter Partes Review. *General Electric Company*, Petitioner v. *United Technologies Corporation*, Patent Owner. IPR2018-01442. U.S. Pat. No. 9,695,751. Entered Feb. 21, 2019. pp. 1-25.
Decision of Technical Board of Appeal in European Patent Application No. 13743042.7 (2809931), Appellant Raytheon Technologies Corporation, Appellant Safran Aircraft Engines, mailed Nov. 21, 2022.
Decision of the Opposition Division, European Patent No. 2949882 (Application No. 15175205.2) dated Nov. 26, 2018.
Decision of the Opposition Division for European Patent No. 2809931, dated Nov. 26, 2018, 12 pages.
Decision of the Opposition Division for European Patent No. 2811120 (14155460.0), dated Jan. 15, 2020.
Decision on Appeal for U.S. Appl. No. 13/446,194, dated Mar. 30, 2016, Appeal 2014-002599.
Decision on Appeal for U.S. Appl. No. 13/446,510, dated Feb. 26, 2016, Appeal 2014-001580.
Decision on Appeal for U.S. Appl. No. 13/558,605, dated Mar. 30, 2016, Appeal 2014-004476.
Decision Revoking EP Patent 3045864 (App 161593124) Jul. 22, 2022.
Decision Revoking EP Patent 3098396 (App 161740519) Jul. 22, 2022.
Decision Revoking European Patent EP2809939 (13786893.1) by the Opposition Division mailed Aug. 5, 2021.
Decision to Deny Institution-Case IPR2018-01171, U.S. Pat. No. 8,297,916B1, *General Electric Company*, Petitioner, v, *United Technologies Corporation*, Patent owner, Entered Nov. 29, 2018, 17 pages.
Decision to Deny Institution-Case IPR2018-01172, U.S. Pat. No. 8,297,916B1, *General Electric Company*, Petitioner, v, *United Technologies Corporation*, Patent owner, Entered Nov. 29, 2018, 58 pages.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Courtney H. Bailey, In re U.S. Pat. No. 8,511,605, Executed Jul. 19, 2016, pp. 1-4.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
Declaration of Dr. Magdy Attia in re U.S. Pat. No. 9,695,751, Executed Jul. 12, 2018, pp. 1-114 and appendices.
Declaration of John Eaton, Ph.D. In re U.S. Pat. No. 8,689,568, Executed Mar. 28, 2016, pp. 1-87.
Declaration of Magdy Attia in re U.S. Pat. No. 8,899,915, Executed Dec. 13, 2016, pp. 1-71.
Declaration of Raymond Drago., In re U.S. Pat. No. 8,297,916, IPR2018-01172, Executed May 29, 2018, pp. 1-115.
Declaration of Raymond Drago, In re U.S. Pat. No. 8,899,915 under 37 C.F.R. 1.68. Executed Dec. 9, 2016, pp. 1-38.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Preliminary Opinion of the Opposition Division in the Opposition to Patent EP3051078, dated Apr. 16, 2019.
Preliminary Opinion of the Opposition Division Issued in the Framework of the Opposition Procedure Against Patent EP2949881 (Application No. 15175203.7).
Preliminary Opinion of the Opposition Division Issued in the Framework of the Opposition Procedure Against Patent EP2949882 (Application No. 15175205.2), dated Mar. 13, 2019.
Press release. The GE90 engine. Retrieved from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.
Princeton, "Composite Materials", https://www.princeton.edu/-humcomp/bikes/design/desi_30.htm, on Oct. 9, 2019, 1 page.
Principal Brief. *Raytheon Technologies Corporation* v. *General Electric Company*. Inter Partes Review No. IPR2018-01442. Filed Aug. 7, 2020. pp. 1-59, appendices 1-98, and 60-1.
Prior Art Direct Drive Engines Statement, 1 page.
Priority document U.S. Appl. No. 14/160,601 dated Jan. 22, 2014.
Product Brochure, BR710, Rolls-Royce, Copyright 2008, pp. 1-4.
Product Brochure. Garrett TFE731. Allied Signal. Copyright 1987. pp. 1-24.
Product Brochure, "TFE731 Engines: A new generation meeting your highest expectations for reliability, cost of ownership and performance", Allied Signal Aerospace, Copyright 1996. pp. 1-10.
Product Brochure. The ALF 502R turbofan: technology, ecology, economy. Avco Lycoming TEXTRON.
Pyrograf-III Carbon Nanofiber. Product guide. Retrieved Dec. 1, 2015 from: http://pyrografproducts.com/Merchant5/merchant.mvc?Screen=cp_nanofiber.
QCSEE ball spline pitch-change mechanism whirligig test report. (1978). NASA-CR-135354. Sep. 1, 1978. pp. 1-57.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE over-the-wing final design report. (1977). NASA-CR-134848. Jun. 1, 1977. pp. 1-460.
QCSEE over-the-wing propulsion system test report vol. III—mechanical performance. (1978). NASA-CR-135325. Feb. 1, 1978. pp. 1-112.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE the aerodynamic and mechanical design of the QCSEE under-the-wing fan. (1977). NASA-CR-135009. Mar. 1, 1977. pp. 1-137.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade design. (1975). NASA-CR-134840. May 1, 1975. pp. 1-51.
QCSEE under-the-wing engine composite fan blade final design test report. (1977). NASA-CR-135046. Feb. 1, 1977. pp. 1-55.
QCSEE under-the-wing engine composite fan blade preliminary design test report. (1975). NASA-CR-134846. Sep. 1, 1975. pp. 1-56.

(56) References Cited

OTHER PUBLICATIONS

QCSEE under-the-wing engine digital control system design report. (1978). NASA-CR-134920. Jan. 1, 1978. pp. 1-309.
Quiet clean general aviation turbofan (QCGAT) technology study final report vol. I. (1975). NASA-CR-164222. Dec. 1, 1975. pp. 1-186.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Rauch, D. (1972). Design study of an air pump and integral lift engine ALF-504 using the Lycoming 502 core. Prepare for NASA. Jul. 1972. pp. 1-182.
*Raytheon Techs. Corp.* V. *General Electric Co.*, 993 F.3d 1374 (Fed. Cir. 2021).
Read, B. (2014). Powerplant revolution. AeroSpace. May 2014. pp. 28-31.
Red Aviation. Part or Material Certification Form for various engine components. Dated Apr. 5, 2017.
Reply to Appeal in the opposition of European Patent Application No. 13786893.1 (2809939) by Rolls-Royce plc dated Apr. 21, 2022.
Reply to Appeal in the opposition of European Patent Application No. 13786893.1 (2809939) by Safran dated May 4, 2022.
Reply to the Observations for European Patent No. EP3097275 (15777258.3) dated Aug. 18, 2021.
Request for Opinion as to Validity for European Patent No. EP2809922 (13778330.4), dated Feb. 6, 2019 by Rolls Royce, 16 pages.
Request for Opinion as to Validity for European Patent No. EP2809922 (13778330.4), dated Feb. 14, 2019 by Rolls Royce, 16 pages.
Request for Opinion as to Validity of European Patent No. 2809922B1 (13778330.4) Observations-in-Reply dated Apr. 3, 2019 by Rolls-Royce.
Request for Opinion filed for European Patent No. EP2532841B1 by Rolls Royce granted Apr. 27, 2016, dated Nov. 7, 2018.
Request for Opinion filed for European Patent No. EP2532858B1 by Rolls Royce granted Oct. 19, 2016, dated Nov. 7, 2018.
Request for Opinion filed for European Patent No. EP2737180B1 by Rolls Royce granted Apr. 13, 2016, dated Jul. 11, 2018.
Reshotko, M., Karchmer, A., Penko, P.F. and Mcardle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Response from the Holder. European Patent Application No. 14155460.0 (2811120) dated Dec. 1, 2016.
Response from the Holder. European Patent Application No. 14155460.0 (2811120) dated Jun. 10, 2015.
Response from the Holder. European Patent Application No. 14155460.0 (2811120) dated Nov. 23, 2015.
Response to Appeal for European Patent No. 2809931 (13743042.7) dated Aug. 22, 2019.
Response to Holder's Response European Patent No. EP2949882 by Safran Aircraft Engines dated Mar. 12, 2019. [with English translation].
Response to Observations by Patantee filed for European Patent No. EP2532841B1 by Rolls Royce granted Apr. 27, 2016, dated Jan. 18, 2019.
Response to Observations by Patantee filed for European Patent No. EP2532858B1 by Rolls Royce granted Oct. 19, 2016, dated Jan. 18, 2019.
2003 NASA seal/secondary air system workshop. (2003). NASA/CP-2004-212963/vol. 1. Sep. 1, 2004. pp. 1-408.
(2012). Gas Power Cycle—Jet Propulsion Technology, A case study. Machine Design Magazine. Nov. 5, 1998. Retrieved from: http://machinedesign.com/content/pw8000-0820.
About GasTurb. Retrieved Jun. 26, 2018 from: http://gasturb.de/about-gasturb.html.

Adams, et al., "The World's Hugest Jet Engine Is Wider Than a 737's Fuselage", Apr. 28, 2016, www.wired.com/2016/04/worlds-hugest-jet-engine-wider-737s-fuselage/ accessed on Apr. 28, 2016, 5 pages.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley Sons, Inc. New York: New York. pp. 1-11, 13-23, 26-33, 50-51, 56-58, 60-61, 64-71, 87-89, 324-329, 436-437.
AGMA Information Sheet, "Double Helical Epicyclic Gear Units," ANSI-AGMA 940-A09, Approved Jan. 6, 2009, pp. 1-22.
AGMA Standard (1997). Design and selection of components for enclosed gear drives. lexandria, VA: American Gear Manufacturers Association. pp. 1-48.
AGMA Standard (1999). Flexible couplings—Mass elastic properties and other characteristics. Alexandria, VA: American Gear Manufacturers Association. pp. 1-46.
AGMA Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modern aero engines. ASME. Prestend at the International Gast Turbine Aeroengine Congress Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Annex to Communication 94(3) EPC—EP3296526—dated Feb. 27, 2020 (Application No. 17199484.1).
Annex to Communication 94(3) EPC—Patent EP3296526—dated Feb. 1, 2019 (Application No. 17199484.1).
Annex to the Notice on Article 94(3) EPC issued by the Examination Division for European Patent Application No. 13837107.5 dated Jan. 25, 2019.
Annexe Mesures—Methodologie de mesure et de calcul, cited in: Notice of Opposition for European Patent No. 2809932 mailed Oct. 1, 2018.
Annexe Mesures—Methodologie de mesure et de calcul. STF495M-4 and STF495M-5. Cited in: Documents cited by Rolls-Royce in anticipation of Oral Proceedings for Opposition of European Patent No. 2809932 dated Jan. 20, 2020.
Annotation of Edkins D.P., et al., "TF34 Turbofan Quiet Engine Study," Final Report prepared for NASA, NASA-CR-120914, Jan. 1, 1972, p. 92.
Annotation of Gray D.E., "Energy Efficient Engine Preliminary Design and Integration Studies," Prepared for NASA, NASA CR-135396, Nov. 1978, p. 70.
Appeal from the United States Patent and Trademark Office, Patent Trial and Appeal Board in No. IPR2018-01442. *Raytheon TechnologiesCorporation* v. *General Electric Company*. Decided Apr. 16, 2021. pp. 1-14.
Appellant's Reply Brief. *Raytheon Technologies Corporation* v. *General Electric Company*. Inter Partes Review No. IPR2018-01442. Filed Oct. 26, 2020. pp. 1-32.
ASME International Gas Turbine Institute, "Trends in the Global Energy Supply and Implications for the Turbomachinery Industry", Global Gas Turbine News, Apr. 2013, vol. 53, Issue. 2, pp. 49-53.

(56) References Cited

OTHER PUBLICATIONS

Attestation by Didier Escure signed Oct. 20, 2020 as filed in the Opposition of European Patent Application No. 13786893.1 (2809939) by Safran Aircraft Engines dated May 4, 2022.
Attestation for Didier Escure Signed Sep. 17, 2018, cited in: Notice of Opposition for European Patent No. 2809932 mailed Oct. 1, 2018.
Attestation of Philippe Pellier signed Apr. 12, 2017, cited in: Notice of Opposition by Safran for European Patent No. EP 2809931 dated Apr. 20, 2017.
August R., "Dynamics of Planetary Gear Trains", Jun. 1984, NASA Contractor Report 3793, pp. 13-16.
Avco Lycoming Divison. ALF 502L Maintenance Manual. Apr. 1981. pp. 1-118.
Aviadvigatel D-110. Jane's Aero-engines, Aero-engines—Turbofan. Jun. 1, 2010.
Aviation Investigation Report A14Q0068. Uncontained turbine rotor failure. Transportation Safety Board of Canada. May 29, 2014. pp. 1-53.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Baskharone E.A., "Principles of Turbomachinery in Air-Breathing Engines," Cambridge University Press, 2006, pp. 261-263.
Berton, J.J. and Guynn, M.D. (2012). Multi-objective optimization of a turbofan for an advanced, single-aisle transport. NASA/TM-2012-217428. pp. 1-26.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Bijewitz, J., Seitz, A., Hornung, M., and Luftfahrt, B. (2014). Architectural comparison of advanced ultra-high bypass ratio turbofans for medium to long range application. Deutscher Luft- und Raumfahrtkongress 2014. pp. 1-12.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing engine acoustic data. NASA-TM-82691. May 1, 1982. pp. 1-28.
Bloomer, H.E. and Samanich, N.E. (1982). QCSEE under-the-wing enging-wing-flap aerodynamic profile characteristics. NASA-TM-82890. Sep. 1, 1982. pp. 1-48.
Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.
Boards of Appeal of the European Patent Office for European Patent Application No. 01992470.3, Sep. 27, 2016, 17 pages.
Boggia, S. and Rud, K.. (2005). Intercooled recuperated gas turbine engine concept. 41st AIAA/ASME/SAE/ASEE Joint Propulsion Conference & Exhibit. Tuscon, Arizona. Jul. 10-13, 2005. pp. 1-11.
Bornstein, N. (1993). Oxidation of advanced intermetallic compounds. Journal de Physique IV, 1993, 03 (C9), pp. C9-367-C9-373.
Bradley A., "Presentation: Engine Design for the Environment," Rolls-Royce, RAeS—Hamburg, Jun. 24, 2010, 64 pages.
Brennan, P.J. and Kroliczek, E.J. (1979). Heat pipe design handbook. Prepared for National Aeronautics and Space Administration by B & K Engineering, Inc. Jun. 1979. pp. 1-348.
Brief Communication from Opponent after Oral Proceedings for European Patent Application No. 13743283.7 (2809932), by Safran Aircraft Engines, dated Dec. 2, 2019.
Brief for Appellee. *Raytheon Technologies Corporation v. General Electric Company.* Inter Partes Review No. IPR2018-01442. Filed Sep. 23, 2020. pp. 1-68.
Brines, G.L. (1990). The turbofan of tomorrow. Mechanical Engineering: The Journal of the American Society of Mechanical Engineers, 108(8), 65-67.

Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Statement of Appeal filed by Safran in European Patent No. EP2809931 (13743042.7) Mar. 22, 2019.
Statement of Grounds for Appeal for European Patent No. 2809931 (13743042.7) mailed Apr. 8, 2019.
Suchezky, M., and Cruzen, G.S. (2012). Variable-speed power-turbine for the large civil tilt rotor. Prepared for NASA. NASA/CR-2012-217424. Feb. 2012. pp. 1-89.
Summons to attend oral proceedings for Application No. 15777258.3 dated Feb. 1, 2021. 13 pgs.
Summons to Attend Oral Proceedings for European Application No. 13743282.9 dated Mar. 3, 2021.
Summons to Attend Oral Proceedings for European Application No. 17210308.7 dated Feb. 25, 2022.
Summons to Attend Oral Proceedings for European Patent Application No. 14155460.0 (2811120) mailed Oct. 15, 2021.
Summons to Attend Oral Proceedings for European Patent Application No. EP13743283.7 (Patent No. EP2809932), dated May 28, 2019.
Summons to Attend Oral Proceedings for European Patent Application No. EP13777804.9 dated Dec. 10, 2019.
Summons to attend oral proceedings for European Patent Application No. EP13777804.9, dated Jul. 7, 2020.
Summons to Attend Oral Proceedings for European Patent Application No. EP13778330.4 (EP2809922) dated Dec. 2, 2019.
Summons to Attend Oral Proceedings for European Patent Application No. EP13822569.3 (EP2841718), dated Oct. 23, 2019, 13 pages.
Summons to Attend Oral Proceedings in European Patent Application No. 13837107.5 mailed Jun. 27, 2022.
Summons to Attend Oral Proceedings in European Patent Application No. 16159312.4 dated Dec. 10, 2021.
Summons to Attend Oral Proceedings in European Patent Application No. 16174051.9 dated Dec. 10, 2021.
Summons to Attend Oral Proceedings in European Patent Application No. 20162850.0 dated Jul. 11, 2022.
Summons to Oral Proceedings for European Patent Application No. 2809931 (13743042.7) mailed May 10, 2021.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Supplementary European Search Report for Application No. EP13743282.9 dated Nov. 2, 2015.
Supplementary European Search Report for Application No. EP13775036.0 dated Sep. 7, 2015.
Supplementary European Search Report for Application No. EP13822569.3 dated Jan. 28, 2016.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

(56) References Cited

OTHER PUBLICATIONS

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Team CCJ. Turbine blade, vane cooling—a primer. Retrieved Oct. 9, 2019 from: https://www.ccj-online.com/turbine-blade-vane-cooling-a-primer/.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
The jet engine. Rolls-Royce plc. 5th Edition. 1996. pp. 48.
The New Oxford Dictionary, Second Edition, Oxford University Press, New York, USA, 2005, p. 1400.
The Oxford English Dictionary, Second Edition, Oxford University Press, Oxford, UK, 1989, vol. XIII, pp. 150-151.
Third Party Observation submitted for EP Application No. EP16156289.7 (Patent No. EP3059393), by Rolls Royce dated Jun. 19, 2019, 5 pages.
Third Party Observations and Concise Description of Relevance of Document for U.S. Appl. No. 15/185,292 dated Jul. 5, 2018.
Third Party Observations and Concise Description of Relevance of Document for U.S. Appl. No. 15/816,487 dated Jul. 25, 2018.
Third Party Observations and Concise Description of Relevance of Document for U.S. Appl. No. 15/856,396 dated Aug. 31, 2018, 32 pages.
Third Party Observations and Concise Description of Relevance of Document for U.S. Appl. No. 15/881,240 dated Aug. 31, 2018.
Third Party Observations for EP Application No. 17199484.1 (EP3296526) dated Oct. 30, 2019 by Rolls Royce.
Third Party Observations for EP Application No. EP11250208.3 (EP2362064), filed Jul. 20, 2018, dated Jul. 26, 2018, 12 pages.
Third Party Observations for EP Application No. EP113854452.3 by Rolls Royce dated Dec. 13, 2018, mailed Jan. 2, 2019, 9 pages.
Third Party Observations for EP Application No. EP12170483.7 by Rolls-Royce dated Oct. 24, 2019.
Third Party Observations for EP Application No. EP13743282.9 (EP2809953) by Rolls-Royce dated Dec. 13, 2018.
Third Party Observations for EP Application No. EP13743282.9 (EP2809953) by Rolls-Royce dated Sep. 20, 2018, 10 pages.
Third Party Observations for EP Application No. EP13775036.0 by Rolls Royce dated Dec. 13, 2018, mailed Jan. 2, 2019, 7 pages.
Third Party Observations for EP Application No. EP13775036.0 by Rolls Royce dated Oct. 11, 2018, mailed Oct. 17, 2018, 6 pages.
Third Party Observations for EP Application No. EP13775188.9 by Rolls Royce dated Dec. 13, 2018, mailed Jan. 2, 2019, 7 pages.
Third Party Observations for EP Application No. EP13775188.9 by Rolls Royce dated Sep. 10, 2018, mailed Sep. 17, 2018, 7 pages.
Third Party Observations for EP Application No. EP13775188.9 (EP2809575), dated May 12, 2020 by Rolls Royce.
Third Party Observations for EP Application No. EP13777804.9, by Rolls Royce dated Dec. 19, 2018, mailed Jan. 2, 2019, 8 pages.
Third Party Observations for EP Application No. EP13777804.9 (EP2809940), by Rolls-Royce, dated Nov. 21, 2019, 3 pages.
Third Party Observations for EP Application No. EP13822569.3 (EP2841718) by Rolls-Royce dated Sep. 10, 2018, 9 pages.
Third Party Observations for EP Application No. EP13822569.3 (EP2841718) dated Dec. 13, 2018.
Third Party Observations for EP Application No. EP14155460.0 (EP2811120) by Rolls Royce dated Oct. 29, 2018.
Third Party Observations for EP Application No. EP16159312.4 (EP3045684), filed Jun. 22, 2018, dated Jul. 3, 2018, 16 pages.
Third Party Observations for EP Application No. EP16174051.9 (EP3098396), filed Jun. 26, 2018, dated Jul. 9, 2018, 12 pages.
Third Party Observations for EP Application No. EP17199484.1 (EP3296526), filed Jul. 5, 2018, dated Jul. 12, 2018, 26 pages.
Third Party Observations for EP Application No. EP18191325.2 (EP3608515) by Rolls Royce dated Mar. 10, 2020.
Third Party Observations for EP Application No. EP18191325.2 (EP3608515) by Rolls Royce dated Mar. 6, 2020.
Third Party Observations for EP Application No. EP18191333.6 (EP3467273) by Rolls Royce dated Mar. 9, 2020.
Third Party Observations for EP Application No. EP2809940 by Rolls Royce dated Mar. 30, 2020.
Third Party Submission and Concise Description of Relevance of Document for U.S. Appl. No. 15/881,240 dated Aug. 28, 2018, 36 pages.
Thulin, R.D., Howe, D.C., and Singer, I.D. (1982). Energy efficient engine: High pressure turbine detailed design report. Prepared for NASA. NASA CR-165608. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Treager, I.E. (1995). Aircraft gas turbine engine technology, 3rd Edition. GLENCOE Aviation Technology Series. McGraw-Hill. p. 445.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines—Turbofan. Nov. 2, 2009.
Turner, M. G., Norris, A., and Veres, J.P. (2004). High-fidelity three-dimensional simulation of the GE90. NASA/TM-2004-212981. pp. 1-18.
Type Certificate Data Sheet No. A23WE, "Department of Transportation Federal Aviation Administration", Oct. 25, 2001, pp. 1-23.
Type Certificate Data Sheet No. E6NE. Department of Transportation Federal Aviation Administration. Jun. 7, 2002. pp. 1-10.
Unicom, "Flying Magazine", Nov. 2002, vol. 129, No. 11, p. 68.
U.S. Appl. No. 13/408,109, filed Feb. 29, 2012, "Geared Turbofan Architecture for Improved Thrust Density".
U.S. Appl. No. 61/494,453, Geared engine flexible mount arrangement. filed Jun. 8, 2011.
United Technologies Pratt & Whitney, Jane's Aero-Engines, Jane's by IHS Markit, Aug. 30, 2000.
U.S. Appl. No. 13/363,154, filed Jan. 31, 2012, 13 pages.
U.S. Appl. No. 13/365,288, filed Feb. 3, 2012, 20 pages.
U.S. Appl. No. 13/407,795, filed Feb. 29, 2012, 19 pages.
U.S. Appl. No. 13/410,776, filed Mar. 2, 2012, 15 pages.
U.S. Appl. No. 13/437,270, filed Apr. 2, 2012, 15 pages.
U.S. Appl. No. 13/437,290, filed Apr. 2, 2012, 15 pages.
U.S. Appl. No. 13/437,304, filed Apr. 2, 2012, 14 pages.
U.S. Appl. No. 13/445,095, filed Apr. 12, 2012, 16 pages.
U.S. Appl. No. 13/446,194, filed Apr. 13, 2012, 17 pages.
U.S. Appl. No. 13/446,312, filed Apr. 13, 2012, 16 pages.
U.S. Appl. No. 13/446,510, filed Apr. 13, 2012, 19 pages.
U.S. Appl. No. 13/455,198, filed May 25, 2012, 16 pages.
U.S. Appl. No. 13/455,235, filed Apr. 25, 2012, 18 pages.
U.S. Appl. No. 13/459,498, filed Apr. 30, 2012, 15 pages.
U.S. Appl. No. 13/483,406, filed May 30, 2012, 20 pages.
U.S. Appl. No. 13/484,589, filed May 31, 2012, 13 pages.
U.S. Appl. No. 13/558,605, filed Jul. 26, 2012, 18 pages.
U.S. Appl. No. 13/629,681, filed Sep. 28, 2012, 38 pages.
U.S. Appl. No. 13/645,606, filed Oct. 5, 2012, 36 pages.
U.S. Appl. No. 13/645,626, filed Oct. 5, 2012, 34 pages.
U.S. Appl. No. 13/645,665, filed Oct. 5, 2012, 34 pages.
U.S. Appl. No. 13/645,773, filed Oct. 5, 2012, 35 pages.
U.S. Appl. No. 13/645,807, filed Oct. 5, 2012, 34 pages.

(56) References Cited

OTHER PUBLICATIONS

U.S. Appl. No. 13/719,620, filed Dec. 19, 2012, 16 pages.

U.S. Department of Transportation: Federal Aviation Administration Advisory Circular. Calibration test, endurance test, and teardown inspection for turbine engine certification. Dated Apr. 13, 2006. pp. 1-41 and Appendices.

U.S. Department of Transportation: Federal Aviation Administration Advisory Circular, Engine Overtorque Test, Calibration Test, Endurance Test, and Teardown Inspection for Turbine Engine Certification, dated Mar. 9, 2015, pp. 1-37 and Appendices.

U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.

U.S. Department of Transportation: Federal Aviation Administration Advisory Circular. Standard operating procedures for flight deck crewmembers, Dated: Feb. 27, 2003, p. 1-6 and Appendices.

U.S. Department of Transportation: Federal Aviation Administration Type Certificate Data Sheet No. E00064EN. Dated: Nov. 24, 2006, pp. 1-5.

U.S. Department of Transportation: Federal Aviation Administration Type Certificate Data Sheet No. E6WE. Dated: May 9, 2000. p. 1-9.

Vasudevan, A.K. and Petrovic, J.J. (1992). A comparative overview of molybedenum disilicide composites. Materials Science and Engineering, A155, 1992. pp. 1-17.

Velex, P. (2012). On the modelling of spur and helical gear dynamic behaviour. In. Dr. M. Gokcek (Ed), Mechanical engineering, InTech, 2012. DOI: 10.5772/36157.

Walsh, P. (2004). Gas turbine performance: 5.11.6 Radial flow turbines versus axial flow turbines. John Wiley and Sons. Blackwell Science, Second Edition. p. 214.

Walsh, P.P. and Fletcher, P. (2004). Gas turbine performance, 2nd Edition. Oxford, UK: Blackwell Science. pp. 1-658.

Walsh P.P., et al., "Gas Turbine Performance," Second Edition, Blackwell Science Ltd, Oxford, UK, 2004, p. 206.

Warwick, G. (2007). Civil engines: Pratt Whitney gears up for the future with GTF. Flight International, Nov. 2007. Retrieved Jun. 14, 2016 from: https://www.flightglobal.com/news/articles/civil-engines-pratt-amp-whitney-gears-up-for-the-future-with-219989/.

Warwick G., "Textron Lycoming LF507: Engine for Change," Flight International, Aug. 31, 1993, pp. 39-41.

Waters, M.H. and Schairer, E.T. (1977). Analysis of turbofan propulsion system weight and dimensions. NASA Technical Memorandum. Jan. 1977. pp. 1-65.

Web Article, GE Aviation, GEnx-28 first engine to test, Jan. 28, 2012, Retrieved from: http://www.geaviation.com/engines/commercial/genx/2b_fett.html, 1 page.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Welch G.E. (2010). Assessment of aerodynamic challenges of a variable-speed power turbine for large civil tilt-rotor application. Prepared for 66th Annual Forum and Technology Display. May 11-13, 2010. NASA/TM-2010-216758. pp. 1-15.

Welch, G.E., Mcvetta, A.B., Stevens, M.A., Howard, S.A., Giel, P.W., Ameri, A.A., To, W., et al. (2012). Variable-speed power-turbine research at Glenn Research Center. Prepared for the 68th Annual Forum and Technology Display. May 1-3, 2012. NASA/TM-2012-217605. pp. 1-23.

Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.

Whitaker, R. (1982). ALF 502: plugging the turbofan gap. Flight International, p. 237-241, Jan. 30, 1982.

"Wide-chord fan—12 years of development", Aircraft Engineering and Aerospace Technology, Jul. 1987, vol. 59, Issue 7, pp. 10-11, Retrieved Jul. 31, 2008 from: https://doi.org/10.1108/eb036471.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting Exhibit. Jan. 6-9, 1992. pp. 1-14.

Wikipedia. Airbus A220. Retrieved from: https://en.wikipedia.org/wiki/Airbus_A220.

Wikipedia. Boeing 737 next generation. Retrieved from: https://en.wikipedia.org/wiki/Boeing_737_Next_Generation.

Wikipedia. CFM International CFM56. Retrieved from: https://en.wikipedia.org/wiki/CFM_International_CFM56.

Wikipedia. Lycoming ALF 502. Retrieved from: https://en.wikipedia.org/wiki/Lycoming_ALF_502.

Wikipedia. Mitsubishi SpaceJet. Retrieved from: https://en.wikipedia.org/wiki/Mitsubishi_SpaceJet.

Wikipedia. Stiffness. Retrieved Jun. 28, 2018 from: https://en.wikipedia.org/wiki/Stiffness.

Wikipedia. Torsion spring. Retreived Jun. 29, 2018 from: https://en.wikipedia.org/wiki/Torsion_spring.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Wilfert, G., Kriegl, B., Scheugenplug, H., Bernard, J., Ruiz, X., and Eury, S. (2005). CLEAN—validation of a high efficient low NOx core, a GTF high speed turbine and an integration of a recuperator in an environmental friendly engine concept. 41st AIAA/ASME/SAE/ASEE Joint Propulsion Conference. Tucson, AZ. Jul. 10-13, 2005. p. 1-11.

Wilfert, G., Kriegl, B., Wald, L., and Johanssen, O. (2005). CLEAN—Validation of a GTF high speed turbine and integration of heat exchanger technology in an environmental friendly engine concept. International Society on Air Breathing Engines. Feb. 2005. pp. 1-8.

Willis, W.S. (1979). Quiet clean short-haul experimental engine (QCSEE) final report. NASA/CR-159473 pp. 1-289.

Winn, A. (Ed). (1990). Wide Chord Fan Club. Flight International, 4217(137). May 23-29, 1990. pp. 34-38.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Wrong C. B., "An Introduction to the JT15D Engine," ASME, 96-GT-119, 1969, 6 pages.

Xie, M. (2008). Intelligent engine systems: Smart case system. NASA/CR-2008-215233. pp. 1-31.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.

Youtube Video, "Pure Power PW1000G Engine: Customer Testimonials", published Jul. 26, 2010 (-seconds 43-63) available at https:www.youtube.com/watch?v=vgQgEftEd8c on Aug. 9, 2018.

Zalud, T. (1998). Gears put a new spin on turbofan performance. Machine Design, 70(20), p. 104.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Zhao, J.C. and Westbrook, J.H. (2003). Ultrahigh-temperature materials for jet engines. MRS Bulletin. vol. 28(9). Sep. 2003. pp. 622-630.

* cited by examiner

GAS TURBINE ENGINE WITH POWER DENSITY RANGE

CROSS-REFERENCE TO RELATED APPLICATION

This application is a continuation of U.S. patent application Ser. No. 17/730,782, filed Apr. 27, 2022, which is a continuation of U.S. patent application Ser. No. 17/037,916, filed Sep. 30, 2020, which is a continuation of U.S. patent application Ser. No. 16/186,811, filed Nov. 12, 2018, which is a continuation of U.S. patent application Ser. No. 14/593,056, filed Jan. 9, 2015, which is a continuation-in-part of U.S. patent application Ser. No. 13/446,312, filed Apr. 13, 2012, which claims priority to U.S. Provisional Application No. 61/619,111, filed Apr. 2, 2012.

BACKGROUND OF THE INVENTION

This application relates to a geared turbofan gas turbine engine, wherein the low and high pressure spools rotate in the same direction relative to each other.

Gas turbine engines are known, and typically include a fan delivering air into a compressor section, and outwardly as bypass air to provide propulsion. The air in the compressor is delivered into a combustion section where it is mixed with fuel and burned. Products of this combustion pass downstream over turbine rotors, driving them to rotate. Typically there are low and high pressure compressors, and low and high pressure turbines.

The high pressure turbine typically drives the high pressure compressor as a high spool, and the low pressure turbine drives the low pressure compressor and the fan. Historically, the fan and low pressure compressor were driven at a common speed.

More recently, a gear reduction has been provided on the low pressure spool such that the fan and low pressure compressor can rotate at different speeds. It desirable to have more efficient engines that have more compact turbines to limit efficiency loses.

SUMMARY

In a featured embodiment, a gas turbine engine turbine comprises a high pressure turbine configured to rotate with a high pressure compressor as a high pressure spool in a first direction about a central axis. A low pressure turbine is configured to rotate with a low pressure compressor as a low pressure spool in the first direction about the central axis. A power density is greater than or equal to about 1.5 and less than or equal to about 5.5 lbf/in$^3$. A fan is connected to the low pressure spool via a speed changing mechanism and will rotate in a second direction opposed to the first direction.

In another embodiment according to the previous embodiment, the power density is greater than or equal to about 2.0.

In another embodiment according to any of the previous embodiments, the power density is greater than or equal to about 4.0.

In another embodiment according to any of the previous embodiments, the power density thrust is calculated using a value that is sea level take-off, flat-rated static thrust.

In another embodiment according to any of the previous embodiments, guide vanes are positioned upstream of a first stage in the low pressure turbine to direct gases downstream of the high pressure turbine as they approach the low pressure turbine.

In another embodiment according to any of the previous embodiments, a mid-turbine frame supports the high pressure turbine.

In another embodiment according to any of the previous embodiments, the guide vanes are positioned intermediate the mid-turbine frame and the low pressure turbine.

In another embodiment according to any of the previous embodiments, the guide vanes are highly cambered such that the vanes direct products of combustion downstream of the high pressure turbine to be properly directed when initially encountering the first stage of the low pressure turbine.

In another embodiment according to any of the previous embodiments, the fan section delivers a portion of air into a bypass duct and a portion of the air into the low pressure compressor as core flow, and has a bypass ratio greater than 6.

In another embodiment according to any of the previous embodiments, the speed changing mechanism is a gear reduction.

In another embodiment according to any of the previous embodiments, a star gear is utilized to change the direction of rotation between the fan and the low pressure spool.

In another embodiment according to any of the previous embodiments, the star gear arrangement has a gear ratio above 2.3:1, meaning that the low pressure spool turns at least or equal to about 2.3 times as fast as the fan.

In another embodiment according to any of the previous embodiments, the speed changing mechanism is a gear reduction.

In another embodiment according to any of the previous embodiments, a star gear is utilized to change the direction of rotation between the fan and the low pressure spool.

In another embodiment according to any of the previous embodiments, the star gear arrangement has a gear ratio above 2.3:1, meaning that the low pressure spool turns at least or equal to about 2.3 times as fast as the fan.

In another featured embodiment, a gas turbine engine turbine comprises a high pressure turbine configured to rotate with a high pressure compressor as a high pressure spool in a first direction about a central axis. A low pressure turbine is configured to rotate in the first direction about the central axis. A power density is greater than or equal to about 4.0. A fan is connected to the low pressure turbine via a gear reduction and will rotate in a second direction opposed to the first direction.

In another embodiment according to the previous embodiment, the power density is a ratio of a thrust provided by the engine to a volume of a turbine section including both the high pressure turbine and the low pressure turbine. The thrust is sea level take-off, flat-rated static thrust.

In another embodiment according to any of the previous embodiments, the fan section delivers a portion of air into a bypass duct and a portion of the air into the low pressure compressor as core flow, and has a bypass ratio greater than 6.

In another embodiment according to any of the previous embodiments, a star gear is utilized to change the direction of rotation between the fan and the low pressure spool.

In another embodiment according to any of the previous embodiments, there is an intermediate turbine section, which drives a compressor rotor.

In another embodiment according to any of the previous embodiments, the gear reduction is positioned intermediate the fan and a compressor rotor driven by the low pressure turbine.

In another embodiment according to any of the previous embodiments, the gear reduction is positioned intermediate the low pressure turbine and a compressor rotor driven by the low pressure turbine.

These and other features may be best understood from the following drawings and specification.

DETAILED DESCRIPTION

Figure 1:
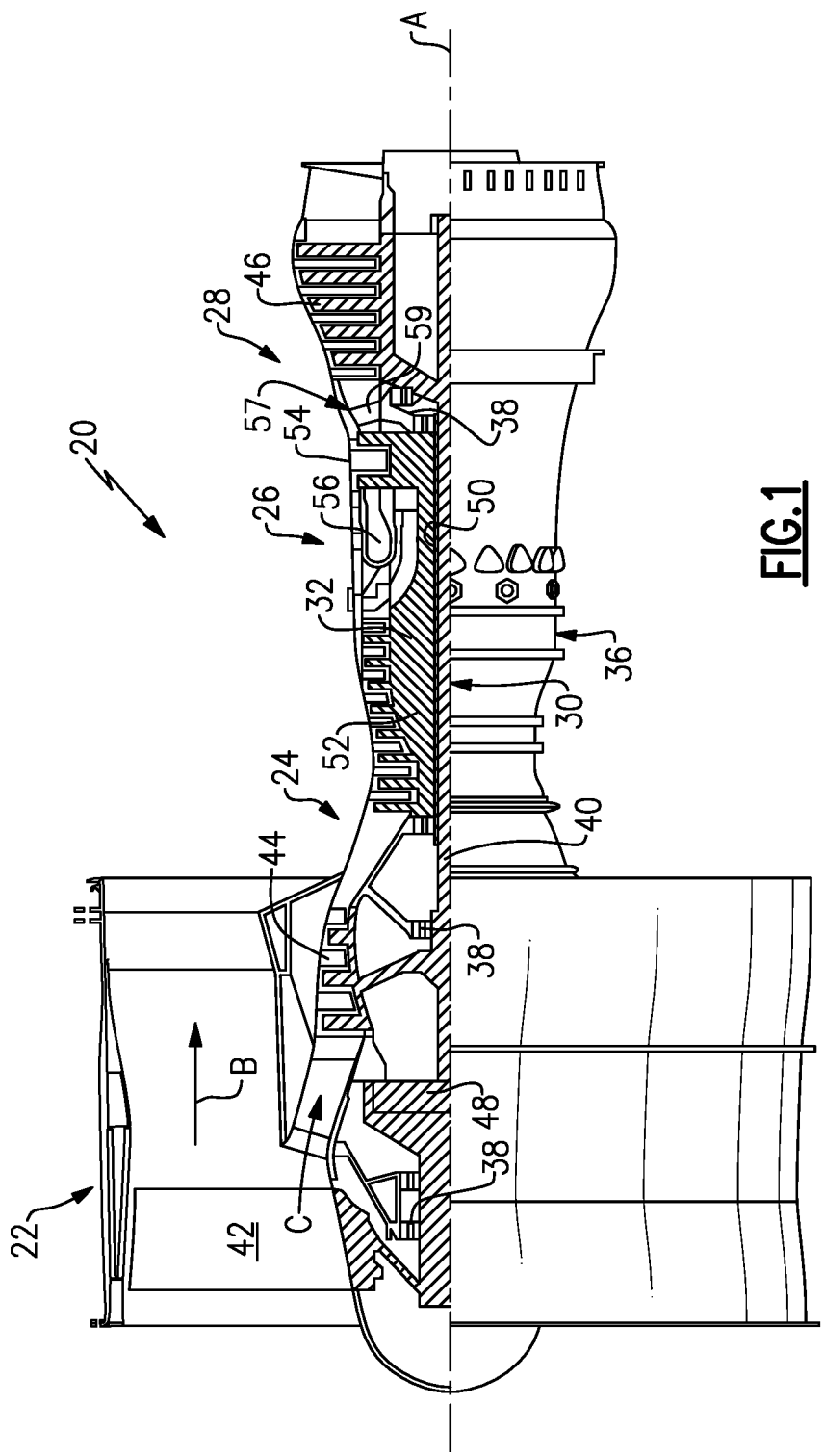
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include, for example, three-spools, an augmentor section, or a different arrangement of sections, among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines. For purposes of this application, the terms "low" and "high" as applied to speed or pressure are relative terms. The "high" speed and pressure would be higher than that associated with the "low" spools, compressors or turbines, however, the "low" speed and/or pressure may actually be "high."

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. The terms "high" and "low" in relation to both the speed and pressure of the components are relative to each other, and not to an absolute value. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path and act as inlet stator vanes to turn the flow to properly feed the first blades of the low pressure turbine. The turbines 46, 54 rotationally drive the respective low speed spool 30 and high speed spool 32 in response to the expansion.

The engine 20 has bypass airflow B, and in one example is a high-bypass geared aircraft engine. The bypass ratio may be defined as the amount of air delivered into the bypass duct divided by the amount delivered into the core flow. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 and the low pressure turbine has a pressure ratio that is greater than about 5:1. Low pressure turbine 46 pressure ratio is the total pressure measured prior to inlet of low pressure turbine 46 as related to the pressure at the outlet of the low pressure turbine 46 prior to an exhaust nozzle. The geared architecture 48 may be a star gear arrangement such that the fan will rotate in a different direction than the low spool. It should be understood, however, that the above parameters are only exemplary of one embodiment of a geared architecture engine and that the present invention is applicable to other gas turbine engines including direct drive turbofans.

A greatest amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Low fan pressure ratio" is the pressure ratio across the fan blade alone, before the Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram deg R)/518.7)^0.5]. The "Low corrected fan tip speed" as disclosed herein according to one non-limiting embodiment is less than about 1150 ft/second at the same cruise point.

Figure 2:
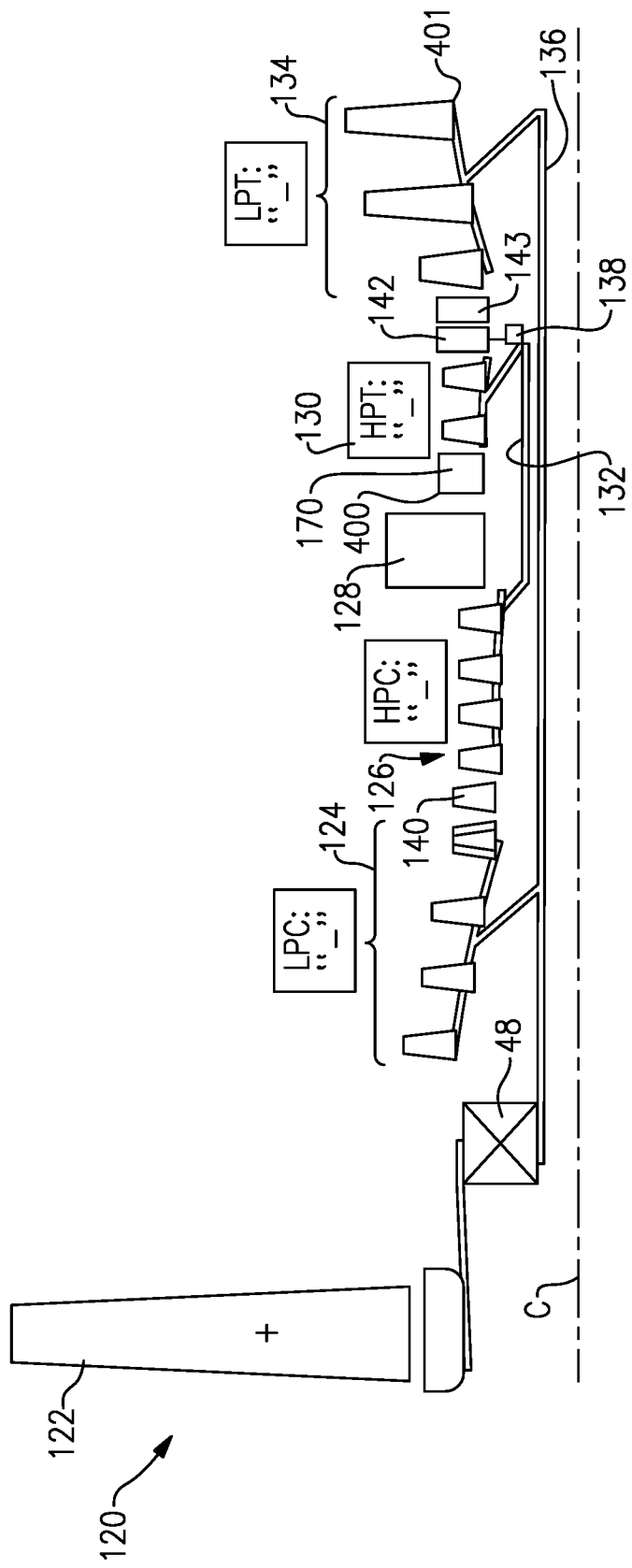
FIG. 2 schematically shows rotational features of one type of such an engine.

FIG. 2 shows detail of an engine 120, which may generally have the features of engine 20 of FIG. 1. A fan 122 is positioned upstream of a low pressure compressor 124, which is upstream of a high pressure compressor 126. A combustor 128 is positioned downstream of the high pressure compressor 126. A mid-turbine frame 142 may be positioned at a downstream end of the high pressure turbine 130, and supports a bearing 138, shown schematically, to support the aft end of the high pressure turbine 130, and a high pressure spool 132. A low pressure turbine 134 is positioned downstream of a mid-turbine frame 142. A low spool 136, driven by the low pressure turbine 134, drives the low pressure compressor 124. The speed change mechanism 48 causes the fan 122 to rotate at a different speed than the low pressure compressor 134. In embodiments of this invention, the speed input to output ratio for the speed change mechanism is above or equal to 2.3:1, and up to less than or equal to 13:1. The gear also causes fan 122 to rotate in an opposed direction relative to the low pressure compressor 124. As mentioned above, a star gear arrangement may be utilized to cause the fan 122 to rotate in the opposed direction ("+") relative to the low pressure compressor 124. In this embodiment the fan generally has less than 26 blades, and the low pressure turbine has at least three stages, and up to six stages. The high pressure turbine generally has one or two stages as shown.

In this particular embodiment, the low pressure compressor 124 and the low pressure turbine 134 rotate in one direction ("−") and the high pressure turbine 130, the high pressure compressor 126, rotate in the same direction ("−").

A strut 140 is shown between the low pressure compressor 124 and the high pressure compressor 126. The strut 140 spans the gas path, and has an airfoil shape, or at least a streamline shape. The combination of a blade at the exit of the low pressure compressor 124, the strut 140, and a variable vane, and then the first blade of the high pressure compressor 126 is generally encompassed within the structure illustrated as the strut 140.

Since the compressor sections 124 and 126 rotate in the same direction, the several airfoils illustrated as the element 140 are required to do less turning of the air flow.

As will be explained below, since the turbine section is provided with a highly cambered vane, there is less turning required between the two turbine sections. Since the compressor is forcing flow with an adverse pressure gradient, and whereas the turbine has a favorable pressure gradient, this overall engine architecture is benefited by the illustrated combination.

Highly cambered inlet guide vanes 143 are positioned in a location intermediate the mid-turbine frame 142 and the most upstream rotor in the low pressure turbine 134. The vanes 143 must properly direct the products of combustion downstream of the high pressure turbine 130 as they approach the first rotor of the low pressure turbine 134. It is desirable for reducing the overall size of the low pressure turbine that the flow be properly directed when it initially encounters the first stage of the low pressure turbine section.

The above features achieve a more compact turbine section volume relative to the prior art, including both the high and low pressure turbines. A range of materials can be selected. As one example, by varying the materials for forming the low pressure turbine, the volume can be reduced through the use of more expensive and more exotic engineered materials, or alternatively, lower priced materials can be utilized. In three exemplary embodiments the first rotating blade of the Low Pressure Turbine can be a directionally solidified casting blade, a single crystal casting blade or a hollow, internally cooled blade. All three embodiments will change the turbine volume to be dramatically smaller than the prior art by increasing low pressure turbine speed. In addition, high efficiency blade cooling may be utilized to further result in a more compact turbine section.

Due to the compact turbine section, a power density, which may be defined as thrust in pounds force produced divided by the volume of the entire turbine section, may be optimized. The volume of the turbine section may be defined by an inlet of a first turbine vane in the high pressure turbine to the exit of the last rotating airfoil in the low pressure turbine, and may be expressed in cubic inches. The static thrust at the engine's flat rated Sea Level Takeoff condition divided by a turbine section volume is defined as power density. The sea level take-off flat-rated static thrust may be defined in lbs force, while the volume may be the volume from the annular inlet of the first turbine vane in the high pressure turbine to the annular exit of the downstream end of the last rotor section in the low pressure turbine. The maximum thrust may be Sea Level Takeoff Thrust "SLTO thrust" which is commonly defined as the flat-rated static thrust produced by the turbofan at sea-level.

Figure 3:
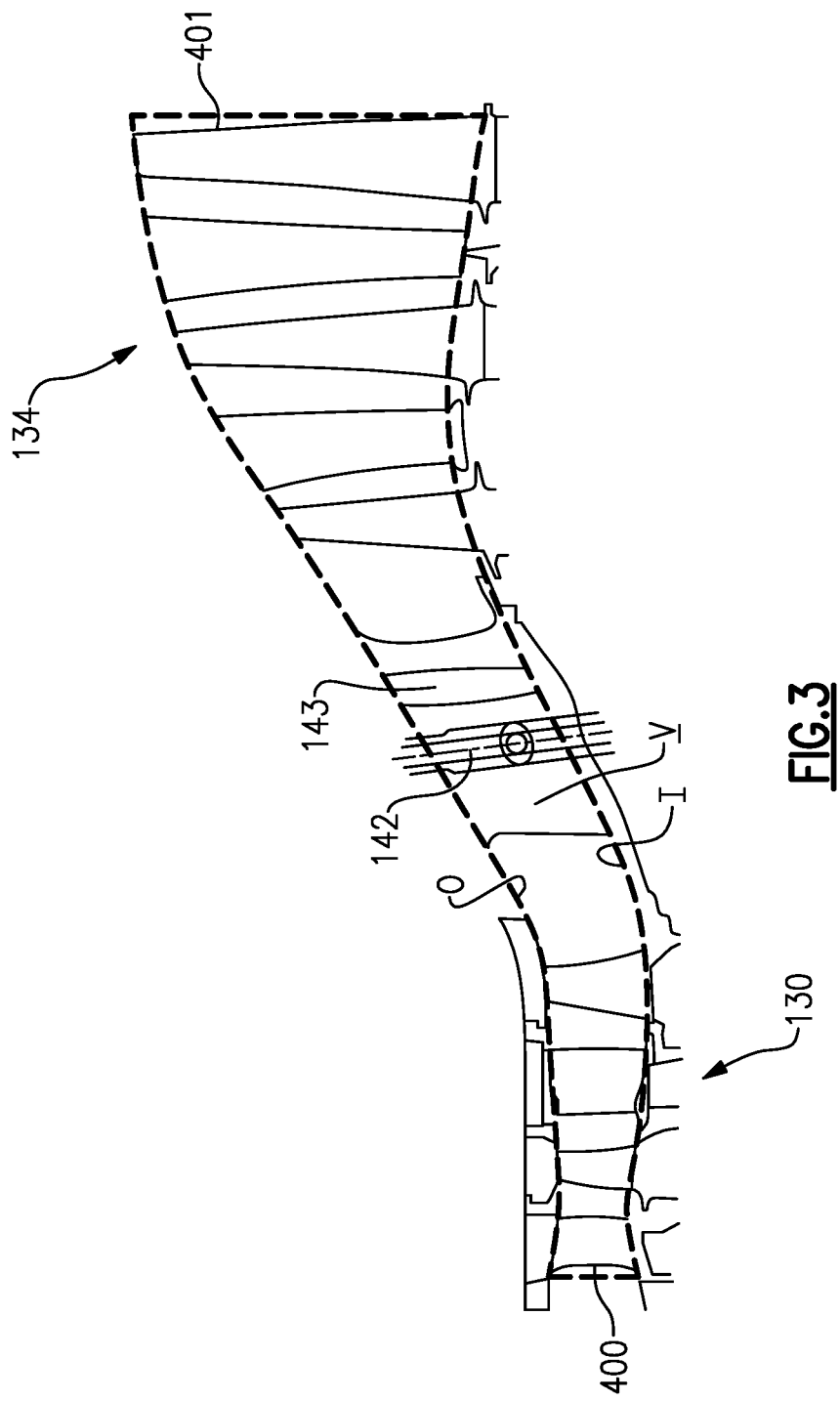
FIG. 3 is a detail of the turbine section volume.

The volume V of the turbine section may be best understood from FIG. 3. As shown, the frame 142 and vane 143 are intermediate the high pressure turbine section 130, and the low pressure turbine section 134. The volume V is illustrated by dashed line, and extends from an inner periphery I to an outer periphery O. The inner periphery is somewhat defined by the flowpath of the rotors, but also by the inner platform flow paths of vanes. The outer periphery is defined by the stator vanes and outer air seal structures along the flowpath. The volume extends from a most upstream end of the vane 400, typically its leading edge, and to the most downstream edge 401 of the last rotating airfoil in the low pressure turbine section 134. Typically this will be the trailing edge of that airfoil.

The power density in the disclosed gas turbine engine is much higher than in the prior art. Eight exemplary engines are shown below which incorporate turbine sections and overall engine drive systems and architectures as set forth in this application, and can be found in Table I as follows:

TABLE 1

| Engine | Thrust SLTO (lbf) | Turbine section volume from the Inlet | Thrust/turbine section volume (lbf/in$^3$) |
|---|---|---|---|
| 1 | 17,000 | 3,859 | 4.41 |
| 2 | 23,300 | 5,330 | 4.37 |
| 3 | 29,500 | 6,745 | 4.37 |
| 4 | 33,000 | 6,745 | 4.84 |
| 5 | 96,500 | 31,086 | 3.10 |
| 6 | 96,500 | 62,172 | 1.55 |
| 7 | 96,500 | 46,629 | 2.07 |
| 8 | 37,098 | 6,745 | 5.50 |

Thus, in embodiments, the power density would be greater than or equal to about 1.5 lbf/in$^3$. More narrowly, the power density would be greater than or equal to about 2.0 lbf/in$^3$.

Even more narrowly, the power density would be greater than or equal to about 3.0 lbf/in$^3$.

More narrowly, the power density is greater than or equal to about 4.0 lbf/in$^3$. More narrowly, the power density is greater than or equal to about 4.5 lbf/in$^3$. Even more narrowly, the power density is greater than or equal to about 4.75 lbf/in$^3$. Even more narrowly, the power density is greater than or equal to about 5.0 lbf/in$^3$.

Also, in embodiments, the power density is less than or equal to about 5.5 lbf/in$^3$.

While certain prior engines have had power densities greater than 1.5, and even greater than 3.2, such engines have been direct drive engines and not associated with a gear reduction. In particular, the power density of an engine known as PW4090 was about 1.92 lbf/in$^3$, while the power density of an engine known as V2500 had a power density of 3.27 lbf/in$^3$.

Engines made with the disclosed architecture, and including turbine sections as set forth in this application, and with modifications coming from the scope of the claims in this application, thus provide very high efficient operation, and increased fuel efficiency and lightweight relative to their trust capability.

Figure 4:
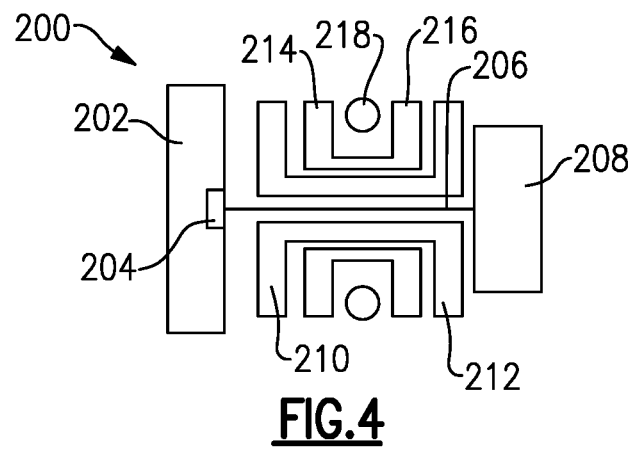
FIG. 4 shows another embodiment.

FIG. 4 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 5:
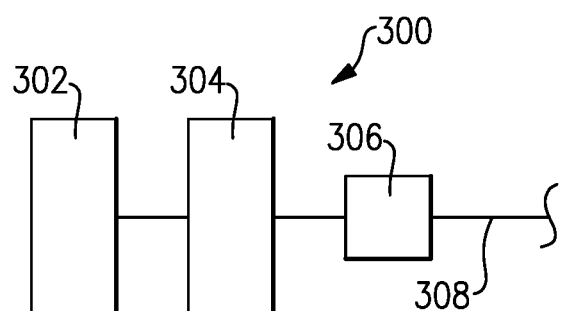
FIG. 5 shows yet another embodiment.

FIG. 5 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The FIG. 4 or 5 engines may be utilized with the density features disclosed above.

Although an embodiment of this invention has been disclosed, a person of ordinary skill in this art would recognize that certain modifications would come within the scope of this application. For that reason, the following claims should be studied to determine the true scope and content of this invention.

What is claimed is:

1. A gas turbine engine comprising:
a propulsor section including a propulsor having a plurality of blades;
a compressor section including a first compressor and a second compressor;
a geared architecture;
a turbine section including a first turbine and a drive turbine, the drive turbine rotatable as a first spool about an engine longitudinal axis, the first turbine rotatable with the second compressor as a second spool about the engine longitudinal axis, and the propulsor driven by the drive turbine through the geared architecture; and
a power density of greater than or equal to 4.75 and less than or equal to 5.5 lbf/in$^3$, wherein the power density is a ratio of a thrust provided by the engine to a volume of the turbine section, the thrust is sea level take-off, flat-rated static thrust, and the volume of the turbine section is defined by an inlet of a first turbine vane in the first turbine to an exit of a last rotating airfoil in the drive turbine.

2. The gas turbine engine as recited in claim 1, wherein:
the geared architecture includes an epicyclic gear train;
the first turbine includes two stages; and
the drive turbine includes three stages.

3. The gas turbine engine as recited in claim 2, wherein a gear reduction ratio of the geared architecture is greater than 2.3.

4. The gas turbine engine as recited in claim 3, wherein the epicyclic gear train is a star gear arrangement.

5. The gas turbine engine as recited in claim 3, wherein the epicyclic gear train is a planetary gear system.

6. The gas turbine engine as recited in claim 3, wherein the propulsor is rotatable at a different speed than the first compressor.

7. The gas turbine engine as recited in claim 3, wherein the first compressor is rotatable with the drive turbine as the first spool such that the first turbine drives both the first compressor and an input of the geared architecture.

8. The gas turbine engine as recited in claim 7, wherein the first compressor includes a plurality of stages, and the second compressor has a greater number of stages than the first compressor.

9. The gas turbine engine as recited in claim 8, wherein the propulsor has less than 26 blades.

10. The gas turbine engine as recited in claim 9, wherein the power density is between 4.84 lbf/in$^3$ and 5.5 lbf/in$^3$.

11. The gas turbine engine as recited in claim 10, wherein the drive turbine includes no more than six stages.

12. The gas turbine engine as recited in claim 11, wherein the turbine section includes a mid-turbine frame arranged between the first turbine and the drive turbine with respect to the engine longitudinal axis, the mid-turbine frame supports a bearing, and the mid-turbine frame includes airfoils in a core airflow path.

13. The gas turbine engine as recited in claim 8, wherein the epicyclic gear train is a star gear arrangement, the first spool is rotatable in a first direction about the engine longitudinal axis, and the propulsor is rotatable in a second direction opposed to the first direction.

14. The gas turbine engine as recited in claim 13, wherein:
the first compressor has a greater number of stages than the first turbine; and
the drive turbine includes no more than six stages.

15. The gas turbine engine as recited in claim 14, wherein the power density is between 4.84 lbf/in$^3$ and 5.5 lbf/in$^3$.

16. The gas turbine engine as recited in claim 15, wherein the second spool is rotatable in the first direction about the engine longitudinal axis.

17. The gas turbine engine as recited in claim 8, wherein the epicyclic gear train is a planetary gear system.

18. The gas turbine engine as recited in claim 17, wherein:
the first compressor has a greater number of stages than the first turbine; and
the drive turbine includes no more than six stages.

19. The gas turbine engine as recited in claim 18, wherein the power density is between 4.84 lbf/in$^3$ and 5.5 lbf/in$^3$.

20. The gas turbine engine as recited in claim 19, wherein the first spool and the second spool are rotatable in a first direction about the engine longitudinal axis.

21. The gas turbine engine as recited in claim 3, wherein:
the propulsor section is a fan section, the propulsor is a fan, and an outer housing surrounds the fan to define a bypass duct; and
the fan section delivers a portion of air into the compressor section, and a portion of air into the bypass duct, and a bypass ratio, which is defined as a volume of air passing to the bypass duct compared to a volume of air passing into the compressor section, is greater than 10 at cruise at 0.8 Mach and 35,000 feet.

22. The gas turbine engine as recited in claim 21, wherein the fan has a low fan pressure ratio of less than 1.45 across the blades alone at cruise at 0.8 Mach and 35,000 feet.

23. The gas turbine engine as recited in claim 22, wherein:
the fan has less than 26 blades; and
the first compressor is rotatable with the drive turbine as the first spool such that the first turbine drives both the first compressor and an input of the geared architecture.

24. The gas turbine engine as recited in claim 23, wherein the epicyclic gear train is a star gear arrangement, the first spool is rotatable in a first direction about the engine longitudinal axis, and the propulsor is rotatable in a second direction opposed to the first direction.

25. The gas turbine engine as recited in claim 24, wherein the power density is between 4.84 lbf/in$^3$ and 5.5 lbf/in$^3$.

26. The gas turbine engine as recited in claim 25, wherein:
the first compressor has a greater number of stages than the first turbine;
the second compressor includes eight stages;
the drive turbine includes no more than six stages; and
the drive turbine includes an inlet, an outlet and a pressure ratio of greater than 5, the pressure ratio being pressure measured prior to the inlet as related to pressure at the outlet prior to an exhaust nozzle.

27. The gas turbine engine as recited in claim 26, wherein the epicyclic gear train is a planetary gear system.

28. The gas turbine engine as recited in claim 27, wherein the power density is between 4.84 lbf/in$^3$ and 5.5 lbf/in$^3$.

29. The gas turbine engine as recited in claim 28, wherein:
the first compressor has a greater number of stages than the first turbine;
the second compressor includes eight stages;
the drive turbine includes no more than six stages; and
the drive turbine includes an inlet, an outlet and a pressure ratio of greater than 5, the pressure ratio being pressure measured prior to the inlet as related to pressure at the outlet prior to an exhaust nozzle.

30. The gas turbine engine as recited in claim 29, wherein the turbine section includes a mid-turbine frame arranged between the first turbine and the drive turbine with respect to the engine longitudinal axis, the mid-turbine frame supports a bearing, and the mid-turbine frame includes airfoils in a core airflow path.

\* \* \* \* \*